(12) United States Patent
Sheikh et al.

(10) Patent No.: US 6,266,721 B1
(45) Date of Patent: Jul. 24, 2001

(54) SYSTEM ARCHITECTURE FOR REMOTE ACCESS AND CONTROL OF ENVIRONMENTAL MANAGEMENT

(75) Inventors: Tahir Q. Sheikh, Fremont; Karl S. Johnson, Palo Alto; Ken Nguyen, San Jose, all of CA (US)

(73) Assignee: Micron Electronics, Inc., Nampa, ID (US)

( * ) Notice: Subject to any disclaimer, the term of this patent is extended or adjusted under 35 U.S.C. 154(b) by 0 days.

(21) Appl. No.: 08/942,160

(22) Filed: Oct. 1, 1997

Related U.S. Application Data

(60) Provisional application No. 60/046,397, filed on May 13, 1997, provisional application No. 60/047,016, filed on May 13, 1997, and provisional application No. 60/046,416, filed on May 13, 1997.

(51) Int. Cl.⁷ .................................................. G06F 13/00
(52) U.S. Cl. ........................................... 710/100; 709/217
(58) Field of Search ..................................... 709/224, 217, 709/219; 714/47; 710/15, 18, 100, 126

(56) References Cited

U.S. PATENT DOCUMENTS

| | | | |
|---|---|---|---|
| 4,057,847 | * 11/1977 | Lowell et al. | 364/200 |
| 4,100,597 | 7/1978 | Fleming et al. | 364/474 |
| 4,449,182 | 5/1984 | Rubinson et al. | 364/200 |
| 4,672,535 | * 6/1987 | Katzman et al. | 364/200 |
| 4,692,918 | 9/1987 | Elliott et al. | 370/85 |
| 4,695,946 | 9/1987 | Andreasen et al. | 364/200 |
| 4,707,803 | 11/1987 | Anthony, Jr. et al. | . |

(List continued on next page.)

FOREIGN PATENT DOCUMENTS

| | | | |
|---|---|---|---|
| 0 866 403 A1 | 9/1998 | (EP) | . |
| 04 333 118 | 11/1992 | (JP) | G06F/1/18 |
| 07 093 064 | 4/1995 | (JP) | G06F/1/26 |

OTHER PUBLICATIONS

Lockareff, M., HTINews., http://www.hometoys.com/htinews/dec96/articles/lonworks.htm, Dec. 1996, "Lonworks—An Introduction".

NetFRAME Systems Incorporated *datasheet*, Feb. 1992, "NF450FT Network Mainframe".

NetFRAME Systems Incorporated, *datasheet*, Mar. 1996, "NetFRAME Cluster Server 8000".

Schofield, M.J., http://www.omegas.co.uk/CAN/canworks.htm, Copyright 1996, 1997, "Controller Area Network—How CAN Works".

http://www.nrtt.demon.co.uk/cantech.html, May 28, 1997, "CAN: Technical overview".

(List continued on next page.)

*Primary Examiner*—Thomas M. Heckler
(74) *Attorney, Agent, or Firm*—Knobbe, Martens Olson & Bear LLP

(57) ABSTRACT

A fault tolerant system by which individual components of a server are monitored and controlled through independent, programmable microcontrollers interconnected through a microcontroller network. An external agent can control and monitor the microcontrollers by extending the interconnection network beyond the physical server. The extension to the interconnection network converts protocols between media, and directs the microcontrollers and the state managed by the microcontrollers. Intervention of the server operating system software is not required and is not utilized for the access and control operations. A remote interface board provides the interface between the microcontroller network and an external modem that communicates with a remote client computer. The remote interface board also provides for connection to a local client computer.

8 Claims, 7 Drawing Sheets

U.S. PATENT DOCUMENTS

| | | | |
|---|---|---|---|
| 4,769,764 | * 9/1988 | Levanon | 364/708 |
| 4,774,502 | 9/1988 | Kimura | 340/501 |
| 4,894,792 | 1/1990 | Mitchell et al. | 364/708 |
| 5,006,961 | 4/1991 | Monico . | |
| 5,033,048 | 7/1991 | Pierce et al. | 371/21.2 |
| 5,051,720 | * 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,121,500 | 6/1992 | Arlington et al. | 395/750 |
| 5,123,017 | 6/1992 | Simpkins et al. | 371/15.1 |
| 5,136,708 | 8/1992 | Lapourtre et al. | 395/650 |
| 5,136,715 | 8/1992 | Hirose et al. | 395/775 |
| 5,138,619 | 8/1992 | Fasang et al. | 371/21.1 |
| 5,157,663 | * 10/1992 | Major et al. | 371/9.1 |
| 5,210,855 | 5/1993 | Bartol | 395/500 |
| 5,222,897 | 6/1993 | Collins et al. | 439/157 |
| 5,245,615 | 9/1993 | Treu | 371/16.5 |
| 5,247,683 | 9/1993 | Holmes et al. | 395/700 |
| 5,253,348 | * 10/1993 | Scalise | 395/325 |
| 5,261,094 | 11/1993 | Everson et al. | 395/600 |
| 5,265,098 | 11/1993 | Mattson et al. | 371/11.1 |
| 5,266,838 | * 11/1993 | Gerner | 307/19 |
| 5,272,382 | 12/1993 | Heald et al. | 307/66 |
| 5,272,584 | 12/1993 | Austruy et al. | 361/58 |
| 5,276,814 | 1/1994 | Bourke et al. | 395/275 |
| 5,276,863 | 1/1994 | Heider | 395/575 |
| 5,277,615 | 1/1994 | Hastings et al. | 439/377 |
| 5,280,621 | 1/1994 | Barnes et al. | 395/800 |
| 5,283,905 | 2/1994 | Saadeh et al. | 395/750 |
| 5,307,354 | 4/1994 | Cramer et al. . | |
| 5,311,397 | 5/1994 | Harshberger et al. | 361/683 |
| 5,311,451 | 5/1994 | Barrett | 364/550 |
| 5,337,413 | 8/1994 | Lui et al. | 395/275 |
| 5,351,276 | 9/1994 | Doll, Jr. et al. . | |
| 5,367,670 | 11/1994 | Ward et al. | 395/575 |
| 5,379,184 | 1/1995 | Barraza et al. | 361/685 |
| 5,379,409 | 1/1995 | Ishikawa | 395/575 |
| 5,388,267 | 2/1995 | Chan et al. | 395/700 |
| 5,402,431 | 3/1995 | Saadeh et al. | 371/67.1 |
| 5,404,494 | 4/1995 | Garney . | |
| 5,430,845 | 7/1995 | Rimmer et al. | 395/275 |
| 5,432,715 | 7/1995 | Shigematsu et al. | 364/551.01 |
| 5,432,946 | * 7/1995 | Allard et al. | 395/750 |
| 5,438,678 | 8/1995 | Smith | 395/750 |
| 5,440,748 | 8/1995 | Sekine et al. . | |
| 5,448,723 | 9/1995 | Rowett | 395/200.02 |
| 5,455,933 | 10/1995 | Schieve et al. | 395/183.03 |
| 5,460,441 | 10/1995 | Hastings et al. | 312/298 |
| 5,463,766 | 10/1995 | Schieve et al. | 395/650 |
| 5,471,617 | 11/1995 | Farrand et al. | 395/700 |
| 5,471,634 | 11/1995 | Giorgio et al. | 395/600 |
| 5,473,499 | * 12/1995 | Weir | 361/58 |
| 5,485,550 | 1/1996 | Dalton | 395/51 |
| 5,485,607 | 1/1996 | Lomet et al. | 395/600 |
| 5,487,148 | 1/1996 | Komori et al. . | |
| 5,491,791 | 2/1996 | Glowny et al. . | |
| 5,513,314 | 4/1996 | Kandasamy et al. | 395/182.04 |
| 5,515,515 | 5/1996 | Kennedy et al. | 395/283 |
| 5,519,851 | 5/1996 | Bender et al. | 395/500 |
| 5,526,289 | * 6/1996 | Dinh et al. | 364/557 |
| 5,528,409 | * 6/1996 | Cucci et al. | 359/171 |
| 5,530,810 | 6/1996 | Bowman | 395/283 |
| 5,533,193 | 7/1996 | Roscoe | 395/183.15 |
| 5,535,326 | 7/1996 | Baskey et al. | 395/182.02 |
| 5,546,272 | * 8/1996 | Moss et al. | 361/687 |
| 5,548,712 | 8/1996 | Larson et al. | 395/182.05 |
| 5,559,764 | * 9/1996 | Chen et al. | 396/30 |
| 5,559,958 | * 9/1996 | Farrand et al. | 395/183.03 |
| 5,559,965 | 9/1996 | Oztaskin et al. . | |
| 5,560,022 | 9/1996 | Dunstan et al. | 395/750 |
| 5,564,024 | 10/1996 | Pemberton | 395/283 |
| 5,566,339 | 10/1996 | Perholtz et al. | 395/750 |
| 5,568,619 | 10/1996 | Blackledge et al. . | |
| 5,572,403 | * 11/1996 | Mills | 361/695 |
| 5,577,205 | 11/1996 | Hwang et al. . | |
| 5,579,487 | 11/1996 | Meyerson et al. | 395/280 |
| 5,579,491 | 11/1996 | Jeffries et al. | 395/283 |
| 5,579,528 | 11/1996 | Register | 395/671 |
| 5,581,714 | 12/1996 | Amini et al. . | |
| 5,584,030 | 12/1996 | Husak et al. | 395/750 |
| 5,586,250 | 12/1996 | Carbonneau et al. | 395/183.2 |
| 5,588,121 | 12/1996 | Reddin et al. | 395/200.15 |
| 5,592,611 | 1/1997 | Midgely et al. | 395/182.02 |
| 5,596,711 | 1/1997 | Burckhartt et al. | 395/182.21 |
| 5,598,407 | * 1/1997 | Bud et al. | 370/330 |
| 5,602,758 | 2/1997 | Lincoln et al. | 364/505 |
| 5,604,873 | 2/1997 | Fite et al. | 395/283 |
| 5,608,876 | 3/1997 | Cohen et al. | 395/281 |
| 5,621,159 | * 4/1997 | Brown et al. | 73/9 |
| 5,621,892 | 4/1997 | Cook | 395/200.1 |
| 5,622,221 | * 4/1997 | Genga, Jr. et al. | 165/208 |
| 5,625,238 | 4/1997 | Ady et al. | 307/147 |
| 5,627,962 | 5/1997 | Goodrum et al. | 395/182.11 |
| 5,630,076 | 5/1997 | Saulpaugh et al. | 395/284 |
| 5,631,847 | 5/1997 | Kikinis | 364/514 R |
| 5,636,341 | 6/1997 | Matsushita et al. | 395/182.11 |
| 5,644,731 | 7/1997 | Liencres et al. | 395/283 |
| 5,652,839 | * 7/1997 | Giorgio et al. | 709/224 |
| 5,652,892 | * 7/1997 | Ugajin | 395/750 |
| 5,652,908 | 7/1997 | Douglas et al. | 395/800 |
| 5,655,081 | 8/1997 | Bonnell et al. . | |
| 5,655,083 | 8/1997 | Bagley | 395/182.31 |
| 5,655,148 | 8/1997 | Richman et al. . | |
| 5,659,682 | 8/1997 | Devarakonda et al. . | |
| 5,664,118 | 9/1997 | Nishigaki et al. | 395/283 |
| 5,666,538 | 9/1997 | DeNicola . | |
| 5,668,943 | 9/1997 | Attanasio et al. | 395/182.05 |
| 5,668,992 | 9/1997 | Hammer et al. | 395/651 |
| 5,669,009 | 9/1997 | Buktenica et al. | 395/800.35 |
| 5,671,371 | * 9/1997 | Kondo et al. | 395/306 |
| 5,675,723 | 10/1997 | Ekrot et al. . | |
| 5,684,671 | 11/1997 | Hobbs et al. . | |
| 5,689,637 | 11/1997 | Johnson et al. . | |
| 5,696,899 | 12/1997 | Kalwitz . | |
| 5,696,949 | 12/1997 | Young | 395/551 |
| 5,701,417 | 12/1997 | Lewis et al. | 395/200.16 |
| 5,704,031 | 12/1997 | Mikami et al. | 395/182.02 |
| 5,715,456 | 2/1998 | Bennett et al. | 395/652 |
| 5,717,570 | 2/1998 | Kikinis | 361/685 |
| 5,721,935 | 2/1998 | DeSchepper et al. | 395/750 |
| 5,724,529 | 3/1998 | Smith et al. . | |
| 5,727,207 | 3/1998 | Gates et al. | 395/651 |
| 5,732,266 | 3/1998 | Moore et al. | 395/651 |
| 5,737,708 | * 4/1998 | Grob et al. | 455/557 |
| 5,742,514 | 4/1998 | Bonola | 364/492 |
| 5,742,833 | * 4/1998 | Dea et al. | 395/750.05 |
| 5,752,164 | * 5/1998 | Jones | 455/33.1 |
| 5,754,396 | 5/1998 | Felcman et al. | 361/683 |
| 5,754,449 | 5/1998 | Hoshal et al. | 364/550 |
| 5,758,165 | 5/1998 | Shuff | 395/712 |
| 5,758,352 | 5/1998 | Reynolds et al. | 707/200 |
| 5,761,085 | * 6/1998 | Giorgio | 709/224 X |
| 5,761,462 | 6/1998 | Neal et al. . | |
| 5,764,924 | 6/1998 | Hong | 395/281 |
| 5,765,008 | 6/1998 | Desai et al. . | |
| 5,767,844 | 6/1998 | Stoye | 345/212 |
| 5,774,741 | 6/1998 | Choi . | |
| 5,777,897 | 7/1998 | Giorgio | 364/557 |
| 5,778,197 | * 7/1998 | Dunham | 395/284 |
| 5,781,703 | 7/1998 | Desai et al. . | |
| 5,781,744 | 7/1998 | Johnson et al. | 395/283 |

| | | | |
|---|---|---|---|
| 5,784,555 | 7/1998 | Stone | 395/200.5 |
| 5,787,019 | 7/1998 | Knight et al. | 364/550 |
| 5,787,459 * | 7/1998 | Stallmo et al. | 711/112 |
| 5,787,491 | 7/1998 | Merkin et al. | 711/173 |
| 5,790,775 * | 8/1998 | Marks et al. | 395/182.07 |
| 5,796,580 * | 8/1998 | Komatsu et al. | 361/687 |
| 5,797,023 | 8/1998 | Berman et al. | 395/750.06 |
| 5,799,196 | 8/1998 | Flannery | 395/750.03 |
| 5,801,921 | 9/1998 | Miller . | |
| 5,802,298 | 9/1998 | Imai et al. | 395/200.47 |
| 5,802,305 * | 9/1998 | McKaughan et al. | 395/200.57 |
| 5,802,324 | 9/1998 | Wunderlich et al. | 395/281 |
| 5,802,592 | 9/1998 | Chess et al. | 711/164 |
| 5,803,357 | 9/1998 | Lakin | 236/78 B |
| 5,809,287 | 9/1998 | Stupek, Jr. et al. | 395/500 |
| 5,809,311 | 9/1998 | Jones | 395/750.01 |
| 5,809,555 | 9/1998 | Hobson | 711/172 |
| 5,812,748 | 9/1998 | Ohran et al. | 395/182.02 |
| 5,812,750 | 9/1998 | Dev et al. . | |
| 5,815,647 | 9/1998 | Buckland et al. | 395/182.01 |
| 5,815,652 | 9/1998 | Ote et al. . | |
| 5,821,596 | 10/1998 | Miu et al. | 257/419 |
| 5,826,043 | 10/1998 | Smith et al. | 395/281 |
| 5,835,719 | 11/1998 | Gibson et al. | 395/200.51 |
| 5,835,738 | 11/1998 | Blackledge, Jr. et al. . | |
| 5,838,932 | 11/1998 | Alzien | 395/308 |
| 5,841,991 | 11/1998 | Russell . | |
| 5,845,061 | 12/1998 | Miyamoto et al. | 395/182.02 |
| 5,845,095 | 12/1998 | Reed et al. | 395/283 |
| 5,850,546 | 12/1998 | Kim | 395/651 |
| 5,852,720 | 12/1998 | Gready et al. . | |
| 5,852,724 | 12/1998 | Glenn, II et al. | 395/200.69 |
| 5,857,074 | 1/1999 | Johnson . | |
| 5,857,102 | 1/1999 | McChesney et al. | 395/653 |
| 5,864,653 | 1/1999 | Tavallaei et al. | 315/181 |
| 5,864,713 | 1/1999 | Terry | 395/872 |
| 5,867,730 | 2/1999 | Leyda | 395/830 |
| 5,875,307 | 2/1999 | Ma et al. | 395/281 |
| 5,875,310 | 2/1999 | Buckland et al. | 395/306 |
| 5,878,237 | 3/1999 | Olarig | 395/308 |
| 5,878,238 | 3/1999 | Gan et al. | 395/308 |
| 5,881,311 | 3/1999 | Woods | 395/824 |
| 5,884,027 | 3/1999 | Garbus et al. | 395/200.8 |
| 5,884,049 | 3/1999 | Atkinson | 395/281 |
| 5,886,424 | 3/1999 | Kim | 307/64 |
| 5,889,965 | 3/1999 | Wallach et al. | 395/283 |
| 5,892,928 | 4/1999 | Wallach et al. | 395/283 |
| 5,898,846 | 4/1999 | Kelly | 395/284 |
| 5,898,888 | 4/1999 | Guthrie et al. | 395/308 |
| 5,905,867 | 5/1999 | Giorgio | 395/200.54 |
| 5,907,672 | 5/1999 | Matze et al. | 395/182.06 |
| 5,909,568 | 6/1999 | Nason | 395/500 |
| 5,911,779 | 6/1999 | Stallmo et al. | 714/6 |
| 5,913,034 | 6/1999 | Malcolm | 395/200.53 |
| 5,922,060 | 7/1999 | Goodrum | 710/103 |
| 5,930,358 | 7/1999 | Rao | 380/4 |
| 5,936,960 | 8/1999 | Stewart | 370/438 |
| 5,964,855 | 10/1999 | Bass et al. | 710/103 |
| 5,983,349 | 11/1999 | Kodama et al. | 713/200 |
| 5,987,554 | 11/1999 | Lui et al. | 710/129 |
| 5,987,627 | 11/1999 | Rawlings, III | 714/48 |
| 6,012,130 | 1/2000 | Beyda et al. | 711/173 |
| 6,038,624 | 3/2000 | Chan et al. | 710/103 |

OTHER PUBLICATIONS

NetFRAME Systems Incorporated, *News Release*, 3 pages, referring to May 9, 1994, "NetFRAME's New High–Availability ClusterServer Systems Avoid Scheduled as well as Unscheduled Downtime."

Herr, et al., Linear Technology Magazine, *Design Features*, pp. 21–23, Jun. 1997, "Hot Swapping the PCI Bus."

ftp.cdrom.com/pub/os2/diskutil/, PHDX software, phdx.zip download, Mar. 1995, "Parallel Hard Disk Xfer."

Cmasters, Usenet post to microsoft.public.windowsnt.setup, Aug. 1997, "Re: FDISK switches."

Hildebrand, N., Usenet post to comp.msdos.programmer, May 1995, "Re: Structure of disk partition info."

Lewis, L., Usenet post to alt.msdos.batch, Apr. 1997, "Re: Need help with automating FDISK and FORMAT."

Netframe, http://www.netframe–support.com/technology/datasheets/data.htm, before Mar. 1997, "Netframe Cluster-System 9008 Data Sheet."

Simos, M., Usenet post to comp.os.msdos.misc, Apr. 1997, "Re: Auto FDISK and FORMAT."

Wood, M. H., Usenet post to comp.os.netware.misc, Aug. 1996, "Re: Workstation duplication method for WIN95."

Lyons, Computer Reseller News, Issue 721, pp. 61–62, Feb. 3, 1997, "ACC Releases Low–Cost Solution for ISPs."

M2 Communications, M2 Presswire, 2 pages, Dec. 19, 1996, "Novell IntranetWare Supports Hot Pluggable PCI from NetFRAME."

Rigney, PC Magazine, 14(17): 375–379, Oct. 10, 1995, "The One for the Road (Mobile–aware capabilities in Windows 95)."

Shanley, and Anderson, PCI System Architecture, Third Edition, p. 382, Copyright 1995.

Davis, T, Usenet post to alt.msdos.programmer, Apr. 1997, "Re: How do I create an FDISK batch file?".

Davis, T., Usenet post to alt.msdos.batch, Apr. 1997, "Re: Need help with automating FDISK and FORMAT . . . ".

NetFrame Systems Incorporated, Doc. No. 78–1000226–01, pp. 1–2, 5–8, 359–404, and 471–512, Apr. 1996, "NetFrame Clustered Multiprocessing Software: NW0496 DC–ROM for Novell® NetWare® 4.1 SMP, 4.1, and 3.12."

Shanley, and Anderson, PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

Shanley and Anderson, PCI System Architecture, Third Edition, Chapters 15 & 16, pp. 297–328, CR 1995.

PCI Hot–Plug Specification, Preliminary Revision for Review Only, Revision 0.9, pp. i–vi, and 1–25, Mar. 5, 1997.

SES SCSI–3 Enclosure Services, X3T10/Project 1212–D/Rev 8a, pp. i, iii–x, 1–76, and I–1 (index), Jan. 16, 1997.

Compaq Computer Corporation, Technology Brief, pp. 1–13, Dec. 1996, "Where Do I Plug the Cable? Solving the Logical–Physical Slot Numbering Problem."

* cited by examiner

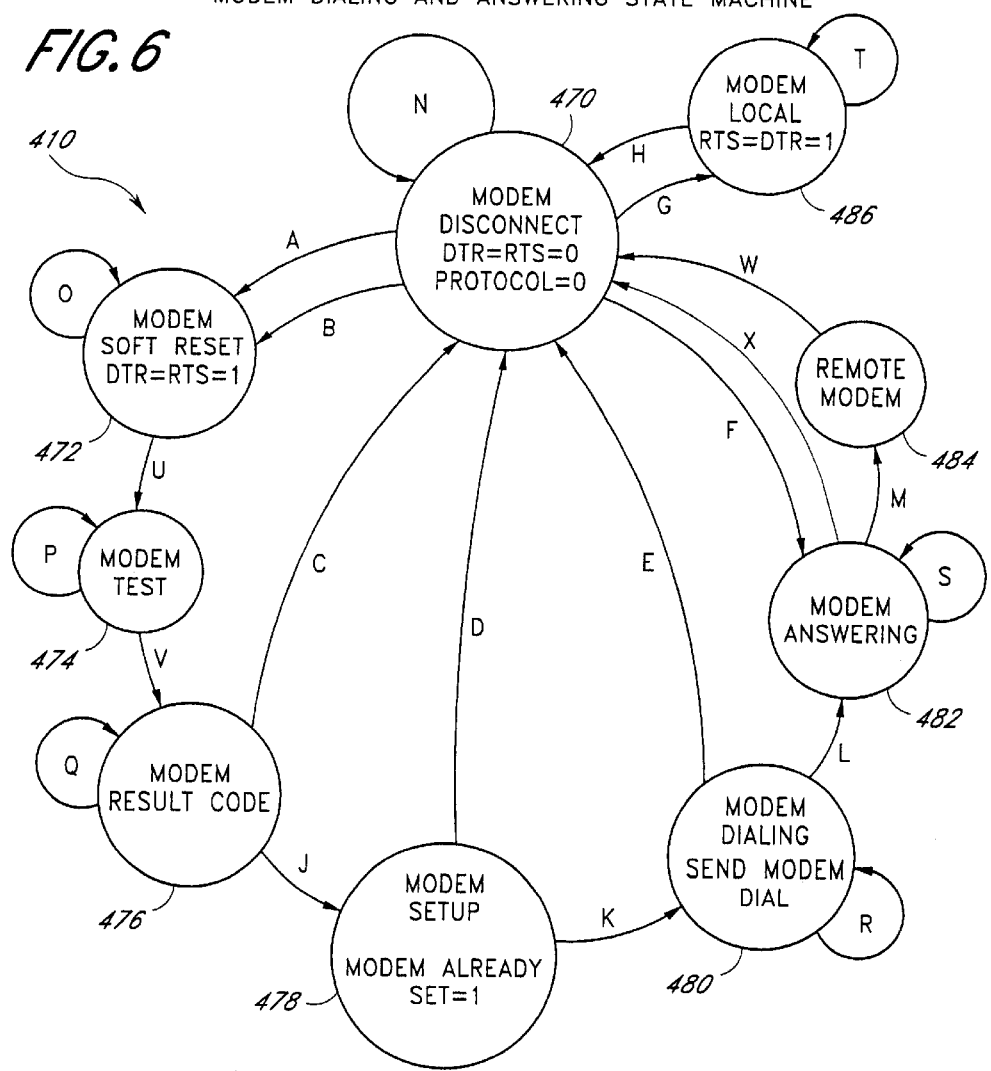

FIG. 6 MODEM DIALING AND ANSWERING STATE MACHINE

- A— CALL OUT (MODEM MODE
  & MODEM ALREADY SET
  & CTS & nDIAL RETRIES)
- B— SETUP (MODEM MODE
  & !MODEM ALREADY SET & CTS)
- C— !RESULT STATUS OK
- D— !nDIAL RETRIES
- E— !DIAL OK
- F— RINGING (MODEM MODE
  & MODEM ALREADY SET
  & CTS & RING)
- G— DSR
- H— (LOCAL & MODEM MODE) V !DSR
- J— RESULT STATUS OK
- K— nDIAL RETRIES
- L— DIAL OK
- M— DSR & DCD
- N— !CTS
  V !nDIAL RETRIES
  V !RING
  V !DSR
- O— !SEND STRING DONE
- P— !SEND STRING DONE
- Q— !MODEM RESULT
  STATUS DONE
- R— !PREV EOS & !2 SECONDS
- S— !DSR
  V !DCD
- T— DSR
- U— SEND STRING DONE
- V— SEND STRING DONE
- W— !DCD
- X— !DCD & TIMEOUT

SYSTEM ARCHITECTURE FOR REMOTE ACCESS AND CONTROL OF ENVIRONMENTAL MANAGEMENT

RELATED APPLICATIONS

The subject matter of U.S. patent application entitled "Method of Remote Access and Control of Environmental Management," filed on Oct. 1, 1997, application Ser. No. 08/942,215, and having is related to this application.

Priority Claim

The benefit under 35 U.S.C. § 119(e) of the following U.S. provisional application(s) is hereby claimed:

| Title | Application Ser. No. | Filing Date |
| --- | --- | --- |
| "Remote Access and Control of Environmental Management System" | 60/046,397 | May 13, 1997 |
| "Hardware and Software Architecture for Inter-Connecting an Environmental Management System with a Remote Interface" | 60/047,016 | May 13, 1997 |
| "Self Management Protocol for a Fly-By-Wire Service Processor" | 60/046,416 | May 13, 1997 |

Appendices

Appendix A, which forms a part of this disclosure, is a list of commonly owned copending U.S. patent applications. Each one of the applications listed in Appendix A is hereby incorporated herein in its entirety by reference thereto.

Appendix B, which forms part of this disclosure, is a copy of the U.S. provisional patent application filed May 13, 1997, entitled "Remote Access and Control of Environmental Management System" and assigned application Ser. No. 60/046,397. Page 1, line 6 of the provisional application has been changed from the original to positively recite that the entire provisional application, including the attached documents, forms part of this disclosure.

Copyrigt Rights

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to fault tolerant computer systems. More specifically, the invention is directed to a system for providing remote access and control of server environmental management.

2. Description of the Related Technology

As enterprise-class servers become more powerful and more capable, they are also becoming increasingly sophisticated and complex. For many companies, these changes lead to concerns over server reliability and manageability, particularly in light of the increasingly critical role of server-based applications. While in the past many systems administrators were comfortable with all of the various components that made up a standards-based network server, today's generation of servers can appear as an incomprehensible, unmanageable black box. Without visibility into the underlying behavior of the system, the administrator must "fly blind." Too often the only indicators the network manager has on the relative health of a particular server is whether or not it is running.

It is well-acknowledged that there is a lack of reliability and availability of most standards-based servers. Server downtime, resulting either from hardware or software faults or from regular maintenance, continues to be a significant problem. By one estimate, the cost of downtime in mission critical environments has risen to an annual total of $4.0 billion for U.S. businesses, with the average downtime event resulting in a $140 thousand loss in the retail industry and a $450 thousand loss in the securities industry. It has been reported that companies lose as much as $250 thousand in employee productivity for every 1% of computer downtime. With emerging Internet, intranet and collaborative applications taking on more essential business roles every day, the cost of network server downtime will continue to spiral upward.

While hardware fault tolerance is an important element of an overall high availability architecture, it is only one piece of the puzzle. Studies show that a significant percentage of network server downtime is caused by transient faults in the I/O subsystem. These faults may be due, for example, to the device driver, the adapter card firmware, or hardware which does not properly handle concurrent errors, and often causes servers to crash or hang. The result is hours of downtime per failure, while a system administrator discovers the failure takes some action, and manually reboots the server. In many cases, data volumes on hard disk drives become corrupt and must be repaired when the volume is mounted. A dismount-and-mount cycle may result from the lack of "hot pluggability" in current standards-based servers. Diagnosing intermittent errors can be a frustrating and time-consuming process. For a system to deliver consistently high availability, it must be resilient to these types of faults. Accurate and available information about such faults is central to diagnosing the underlying problems and taking corrective action.

Modern fault tolerant systems have the functionality to provide the ambient temperature of a storage device enclosure and the operational status of other components such as the cooling fans and power supply. However, a limitation of these server systems is that they do not contain self-managing processes to correct malfunctions. Also, if a malfunction occurs in a typical server, it relies on the operating system software to report, record and manage recovery of the fault. However, many types of faults will prevent such software from carrying out these tasks. For example, a disk drive failure can prevent recording of the fault in a log file on that disk drive. If the system error caused the system to power down, then the system administrator would never know the source of the error.

Traditional systems are lacking in detail and sophistication when notifying system administrators of system malfunctions. System administrators are in need of a graphical user interface for monitoring the health of a network of servers. Administrators need a simple point-and-click interface to evaluate the health of each server in the network. In addition, existing fault tolerant servers rely upon operating system maintained logs for error recording. These systems are not capable of maintaining information when the operating system is inoperable due to a system malfunction. Existing systems do not have a system log for maintaining information when the main computational processors are inoperable.

Another limitation of the typical fault tolerant system is that the control logic for the diagnostic system is associated with a particular processor. Thus, if the environmental control processor malfunctioned, then all diagnostic activity on the computer would cease. In traditional systems, if a controller dedicated to the fan system failed, then all fan activity could cease resulting in overheating and ultimate failure of the server. What is desired is a way to obtain diagnostic information when the server OS is not operational or even when main power to the server is down.

Existing fault tolerant systems also lack the power to remotely control a particular server, such as powering up and down, resetting, retrieving or updating system status, displaying flight recorder and so forth. Such control of the server is desired even when the server power is down. For example, if the operating system on the remote machine failed, then a system administrator would have to physically go to the remote machine to re-boot the malfunctioning machine before any system information could be obtained or diagnostics could be started.

Therefore, a need exists for improvements in server management which will result in greater reliability and dependability of operation. Server users are in need of a management system by which the users can accurately gauge the health of their system. Users need a high availability system that must not only be resilient to faults, but must allow for maintenance, modification, and growth—without downtime. System users must be able to replace failed components, and add new functionality, such as new network interfaces, disk interface cards and storage, without impacting existing users. As system demands grow, organizations must frequently expand, or scale, their computing infrastructure, adding new processing power, memory, storage and I/O capacity. With demand for 24-hour access to critical, server-based information resources, planned system downtime for system service or expansion has become unacceptable.

SUMMARY OF THE INVENTION

Embodiments of the inventive remote access system provides system administrators with new levels of client/server system availability and management. It gives system administrators and network managers a comprehensive view into the underlying health of the server—in real time, whether on-site or off-site. In the event of a failure, the invention enables the administrator to learn why the system failed, why the system was unable to boot, and to control certain functions of the server from a remote station.

One embodiment of the present invention is a system for external management of a server environment, the system comprising a first computer having a plurality of components; a second computer connected to the first computer; a plurality of microcontrollers that monitor components of the first computer; a bus that interconnects the microcontrollers; and a remote interface circuit that interfaces the microcontrollers with the second computer thereby facilitating the external management of the first computer components.

Another embodiment of the present invention is a system for external management of a computer environment, the system comprising a first computer having a plurality of components; a second computer connected to the first computer; means for monitoring components of the first computer; and means for interfacing the monitoring means with the second computer to facilitate the external management of the first computer components.

Yet another embodiment of the present invention is a remote interface, comprising a microcontroller; a memory connected to the microcontroller, a first port capable of receiving and transmitting monitoring data; and a second port capable of receiving and transmitting monitoring data, wherein the second port includes connectivity to a microcontroller bus.

BRIEF DESCRIPTION OF THE DRAWINGS

FIG. 6 is a diagram of a modem dialing and answering state machine defined in FIG. 5a.

DETAILED DESCRIPTION OF THE INVENTION

The following detailed description presents a description of certain specific embodiments of the present invention. In this description, reference is made to the drawings wherein like parts are designated with like numerals throughout.

For convenience, the discussion of the invention is organized into the following principal sections: Introduction, Server System, Microcontroller Network, Remote Interface Board, Remote Interface Serial Protocol, and RIB Microcontroller Operation.

I. INTRODUCTION

The inventive computer server system and client computer includes a distributed hardware environment management system that is built as a small self-contained network of microcontrollers. Operating independently of the system processor and operating system software, embodiments of present invention uses separate processors for providing information and managing the hardware environment including fans, power supplies and temperature.

Initialization, modification and retrieval of system conditions are performed through utilization of a remote interface by issuing commands to the environmental processors. The system conditions may include system log size, presence of faults in the system log, serial number for each of the environmental processors, serial numbers for each power supply of the system, system identification, system log count, power settings and presence, canister presence, temperature, BUS/CORE speed ratio, fan speeds, settings for fan faults, LCD display, Non-Maskable Interrupt (NMI) request bits, CPU fault summary, FRU status, JTAG enable bit, system log information, remote access password, over-temperature fault, CPU error bits, CPU presence, CPU thermal fault bits, and remote port modem. The aforementioned list of capabilities provided by the present environmental system is not all-inclusive.

The server system and client computer provides mechanisms for the evaluation of the data that the system collects and methods for the diagnosis and repair of server problems in a manner that system errors can be effectively and efficiently managed. The time to evaluate and repair problems is minimized. The server system ensures that the system will not go down, so long as sufficient system resources are available to continue operation, but rather degrade gracefully until the faulty components can be replaced.

II. SERVER SYSTEM

Figure 1:
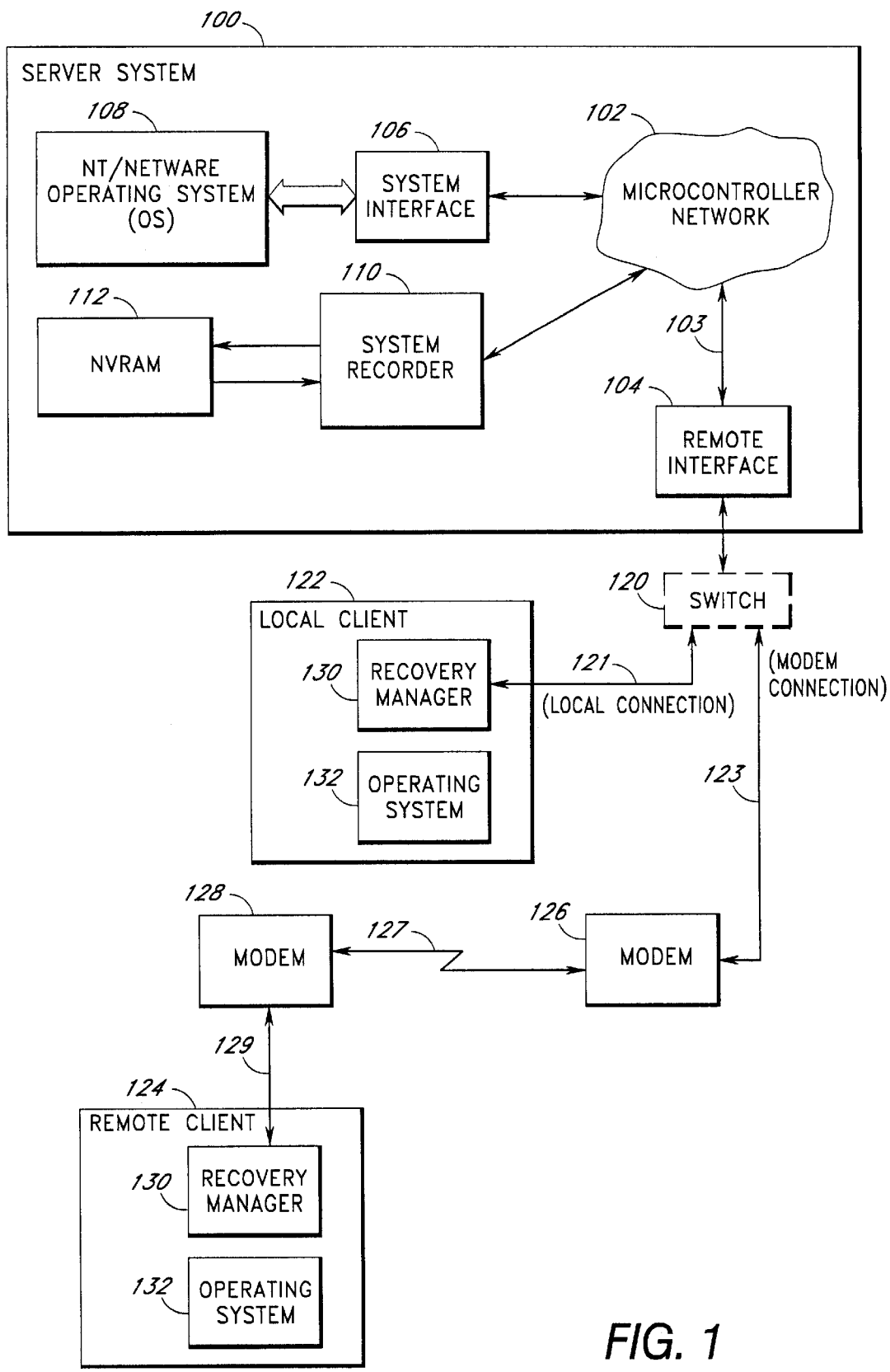
FIG. 1 is a top level block diagram of microcontroller network components utilized by an embodiment of the present invention.

Referring to FIG. 1, a server system 100 with a remote client computer will be described. In a one embodiment, the server system hardware environment 100 may be built around a self-contained network of microcontrollers, such as, for example, a remote interface microcontroller on the remote interface board or circuit 104, a system interface microcontroller 106 and a system recorder microcontroller 110. This distributed service processor network 102 may operate as a fully self-contained subsystem within the server system 100, continuously monitoring and managing the physical environment of the machine (e.g., temperature, voltages, fan status). The microcontroller network 102 continues to operate and provides a system administrator with critical system information, regardless of the operational status of the server 100.

Information collected and analyzed by the microcontroller network 102 can be presented to a system administrator using either SNMP-based system management software (not shown), or using microcontroller network Recovery Manager software 130 through a local connection 121 or a dial-in connection 123. The system management software, which interfaces with the operating system (OS) 108 such as Microsoft Windows NT Version 4.0 or Novell Netware Version 4.11, for example, provides the ability to manage the specific characteristics of the server system, including Hot Plug Peripheral Component Interconnect (PCI), power and cooling status, as well as the ability to handle alerts associated with these features.

The microcontroller network Recovery Manager software 130 allows the system administrator to query the status of the server system 100 through the microcontroller network 102, even when the server is down. Using the microcontroller network remote management capability, a system administrator can use the Recovery Manager 130 to re-start a failed system through a modem connection 123. First, the administrator can remotely view the microcontroller network Flight Recorder, a feature that stores all system messages, status and error reports in a circular Non-Volatile Random Access Memory buffer (NVRAM) 112. Then, after determining the cause of the system problem, the administrator can use microcontroller network "fly by wire" capability to reset the system, as well as to power the system off or on. "Fly by wire" denotes that no switch, indicator or other control is directly connected to the function it monitors or controls, but instead, all the control and monitoring connections are made by the microcontroller network 102.

The remote interface board (RIB) 104 interfaces the server system 100 to an external client computer. The RIB 104 may be internal or external to an enclosure of the server 100. Furthermore, the RIB may be incorporated onto another circuit of the server, such as a system board 150 (FIG. 2) or a backplane 152 of the server. The RIB 104 connects to either a local client computer 122 at the same location as the server 100 or to a remote client computer 124 through an optional switch 120. The client computer 122/124 may in one embodiment run either Microsoft Windows 95 or Windows NT Workstation version 4.0 operating system (OS) 132.

The client computer 122/124 could be another server, such as, for example, a backup server. The client computer 122/124 could also be a handheld computer such as, for example, a personal digital assistant (PDA). It is not necessary that Operating System software be running on the client computer 122/124. For example, the client computer 122/124 could be hard-wired for specific tasks, or could have special purpose embedded software.

The processor and RAM requirements of the client computer 122/124 are such as necessary by the OS 132. The serial port of the client computer 122/124 may utilize a type 16550A Universal Asynchronous Receiver Transmitter (UART). The switch 120 facilitates either the local connection 121 or the modem connection 123 at any one time, but allows both types of connections to be connected to the switch. In an another embodiment, either the local connection 121 or the modem connection 123 is connected directly to the RIB 104. The local connection 121 utilizes a readily available null-modem serial cable to connect to the local client computer. The modem connection may utilize a Hayes-compatible server modem 126 and a Hayes-compatible client modem 128. In one embodiment, a model V.34X 33.6K data/fax modem available from Zoom is utilized as the client modem and the server modem. In another embodiment, a Sportster 33.6K data/fax modem available from US Robotics is utilized as the client modem.

The steps of connecting the remote client computer 124 to the server 100 will now be briefly described. The remote interface 104 has a serial port connector 204 (FIG. 3) that directly connects with a counterpart serial port connector of the external server modem 126 without the use of a cable. If desired, a serial cable could be used to interconnect the remote interface 104 and the server modem 126. The cable end of an AC to DC power adapter (not shown, for example a 120 Volt AC to 7.5 Volt DC, or a 220V, European or Japanese adapter) is then connected to the DC power connector J2 (220, FIG. 3) of the remote interface, while the double-prong end is plugged into a 120 Volt AC wall outlet. One end of an RJ-45 parallel-wire data cable 103 is then plugged into an RJ-45 jack (226, FIG. 3) on the remote interface 104, while the other end is plugged into a RJ-45 Recovery Manager jack on the server 100. The RJ-45 jack on the server then connects to the microcontroller network 102. The server modem 126 is then connected to a communications network 127 using an appropriate connector. The communications network 127 may be a public switched telephone network, although other modem types and communication networks are envisioned. For example, if cable modems are used for the server modem 126 and client modem 128, the communications network can be a cable television network. As another example, satellite modulator/demodulators can be used in conjunction with a satellite network.

In another embodiment, the server modem to client modem connection may be implemented by an Internet connection utilizing the well known TCP/IP protocol. Any of several Internet access devices, such as modems or network interface cards, may be utilized. Thus, the communications network 127 may utilize either circuit or packet switching.

At the remote client computer 124, a serial cable (25-pin D-shell) 129 is used to interconnect the client modem 128 and the client computer 124. The client modem 128 is then connected to the communications network 127 using an appropriate connector. Each modem is then plugged into an appropriate power source for the modem, such as an AC outlet. At this time, the Recovery Manager software 130 is loaded into the client computer 124, if not already present, and activated.

The steps of connecting the local client computer 122 to the server 100 are similar, but modems are not necessary. The main difference is that the serial port connector of the remote interface 104 connects to a serial port of the local client computer 122 by the null-modem serial cable 121.

III. MICROCONTROLLER NETWORK

In one embodiment, the invention is implemented by a network of microcontrollers 102 (FIG. 1). The microcontrollers may provide functionality for system control, diagnostic routines, self-maintenance control, and event logging processors. A further description of the microcontrollers and microcontroller network is provided in U.S. patent application Ser. No. 08/942,402 entitled "Diagnostic and Managing Distributed Processor System".

Figure 2:
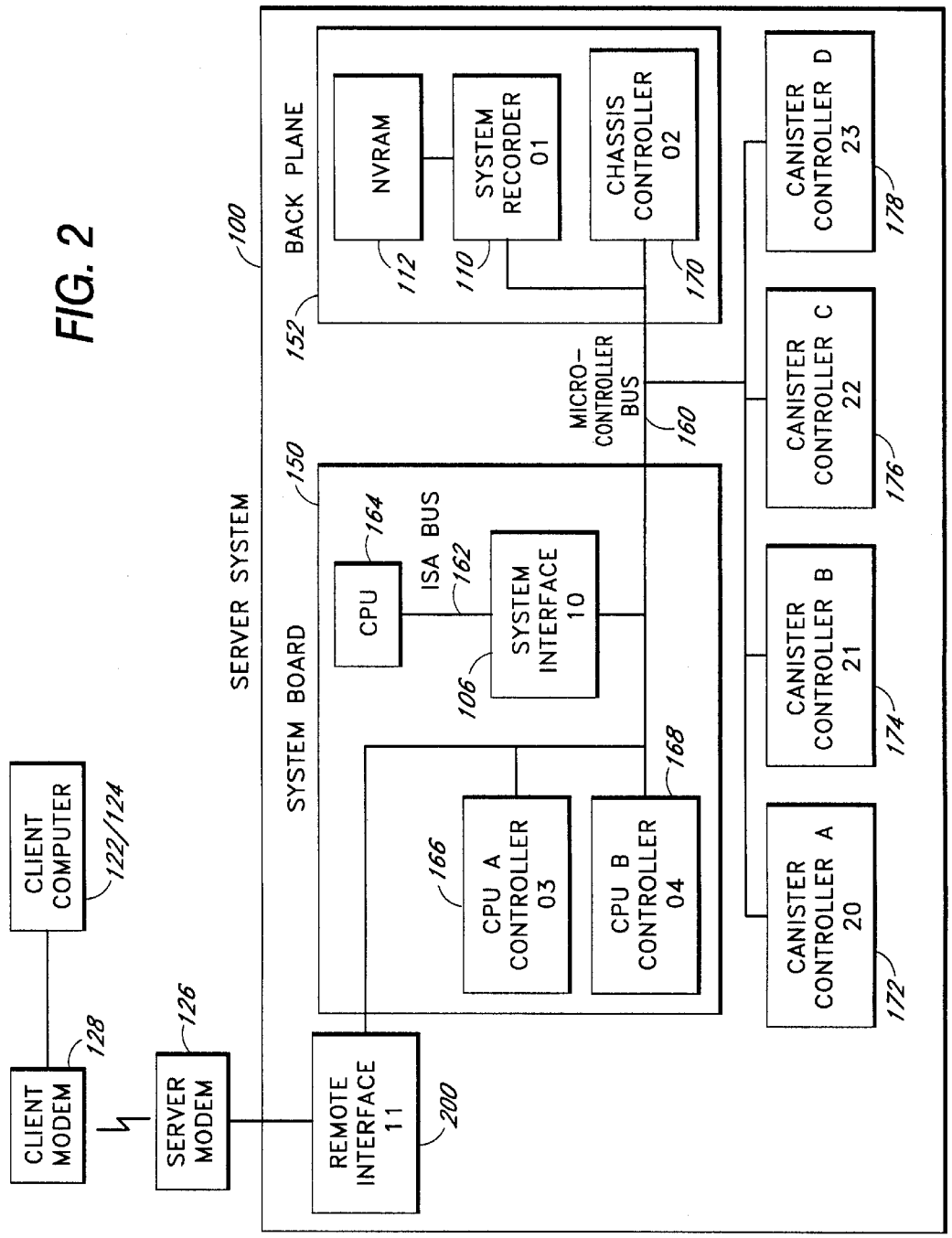
FIG. 2 is a block diagram of the server portion of the microcontroller network shown in FIG. 1.

Referring to FIG. 2, in one embodiment of the invention, the network of microcontrollers 102 includes ten processors. One of the purposes of the microcontroller network 102 is to transfer messages to the other components of the server system 100. The processors may include: a System Interface controller 106, a CPU A controller 166, a CPU B controller 168, a System Recorder 110, a Chassis controller 170, a Canister A controller 172, a Canister B controller 174, a Canister C controller 176, a Canister D controller 178 and a Remote Interface controller 200. The Remote Interface controller 200 is located on the RIB 104 (FIG. 1) which is part of the server system 100, but may preferably be external to the server enclosure. The System Interface controller 106, the CPU A controller 166 and the CPU B controller 168 are located on thr system board 150 in the server 100. Also located on the system board are one or more central processing units (CPUs) or microprocessors 164 and an Industry Standard Architecture (ISA) bus 162 that connects to the System Interface Controller 106. Of course, other buses such as PCI, EISA and Microchannel may be used. The CPU 164 may be any conventional general purpose single-chip or multi-chip microprocessor such as a Pentium®, Pentium® Pro or Pentium® II processor available from Intel Corporation, a SPARC processor available from Sun Microsystems, a MIPS® processor available from Silicon Graphics, Inc., a Power PC® processor available from Motorola, or an ALPHA® processor available from Digital Equipment Corporation. In addition, the CPU 164 may be any conventional special purpose microprocessor such as a digital signal processor or a graphics processor.

The System Recorder 110 and Chassis controller 170, along with the NVRAM 112 that connects to the System Recorder 110, may be located on the backplane 152 of the server 100. The System Recorder 110 and Chassis controller 170 are typically the first microcontrollers to power up when server power is applied. The System Recorder 110, the Chassis controller 170 and the Remote Interface microcontroller 200 are the three microcontrollers that have a bias 5 volt power supplied to them. If main server power is off, an independent power supply source for the bias 5 volt power is provided by the RIB 104 (FIG. 1). The Canister controllers 172–178 are not considered to be part of the backplane 152 because they are located on separate cards and are removable.

Each of the microcontrollers has a unique system identifier or address. The addresses are as follows in Table 1:

TABLE 1

| Microcontroller | Address |
| --- | --- |
| System Interface controller 106 | 10 |
| CPU A controller 166 | 03 |
| CPU B controller 168 | 04 |
| System Recorder 110 | 01 |
| Chassis controller 170 | 02 |
| Canister A controller 172 | 20 |
| Canister B controller 174 | 21 |
| Canister C controller 176 | 22 |
| Canister D controller 178 | 23 |
| Remote Interface controller 200 | 11 |

The microcontrollers may be Microchip Technologies, Inc. PIC processors in one embodiment, although other microcontrollers, such as an 8051 available from Intel, an 8751 available from Atmel, and a P80CL580 microprocessor available from Philips, could be utilized. The PIC16C74 (Chassis controller 170) and PIC16C65 (the other controllers) are members of the PIC16CXX family of CMOS, fully-static, EPROM-based 8-bit microcontrollers. The PIC controllers have 192 bytes of RAM, in addition to program memory, three timer/counters, two capture/compare/Pulse Width Modulation modules and two serial ports. The synchronous serial port is configured as a two-wire Inter-Integrated Circuit ($I^2C$) bus in one embodiment of the invention. The PIC controllers use a Harvard architecture in which program and data are accessed from separate memories. This improves bandwidth over traditional von Neumann architecture processors where program and data are fetched from the same memory. Separating program and data memory further allows instructions to be sized differently than the 8-bit wide data word. Instruction opcodes are 14-bit wide making it possible to have all single word instructions. A 14-bit wide program memory access bus fetches a 14-bit instruction in a single cycle.

In one embodiment of the invention, the microcontrollers communicate through an $I^2C$ serial bus, also referred to as a microcontroller bus 160. The document "The $I^2C$ Bus and How to Use It" (Philips Semiconductor, 1992) is hereby incorporated by reference. The $I^2C$ bus is a bidirectional two-wire bus that may operate at a 400 kbps. However, other bus structures and protocols could be employed in connection with this invention. For example, Apple Computer ADB, Universal Serial Bus, IEEE-1394 (Firewire), IEEE488 (GPIB), RS485, or Controller Area Network (CAN) could be utilized as the microcontroller bus. Control on the microcontroller bus is distributed. Each microcontroller can be a sender (a master) or a receiver (a slave) and each is interconnected by this bus. A microcontroller directly controls its own resources, and indirectly controls resources of other microcontrollers on the bus.

Here are some of the features of the $I^2C$-bus:

Two bus lines are utilized: a serial data line (SDA) and a serial clock line (SCL).

Each device connected to the bus is software addressable by a unique address and simple master/slave relationships exist at all times; masters can operate as master-transmitters or as master-receivers.

The bus is a true multi-master bus including collision detection and arbitration to prevent data corruption if two or more masters simultaneously initiate data transfer.

Serial, 8-bit oriented, bidirectional data transfers can be made at up to 400 kbit/second in the fast mode.

Two wires, serial data (SDA) and serial clock (SCL), carry information between the devices connected to the I²C bus. Each device is recognized by a unique address and can operate as either a transmitter or receiver, depending on the function of the device. For example, a memory device connected to the I²C bus could both receive and transmit data. In addition to transmitters and receivers, devices can also be considered as masters or slaves when performing data transfers (see Table 2). A master is the device which initiates a data transfer on the bus and generates the clock signals to permit that transfer. At that time, any device addressed is considered a slave.

TABLE 2

Definition of I²C-bus terminology

| Term | Description |
| --- | --- |
| Transmitter | The device which sends the data to the bus |
| Receiver | The device which receives the data from the bus |
| Master | The device which initiates a transfer, generates clock signals and terminates a transfer |
| Slave | The device addressed by a master |
| Multi-master | More than one master can attempt to control the bus at the same time without corrupting the message |
| Arbitration | Procedure to ensure that, if more than one master simultaneously tries to control the bus, only one is allowed to do so and the message is not corrupted |
| Synchronization | Procedure to synchronize the clock signal of two or more devices |

The I²C-bus is a multi-master bus. This means that more than one device capable of controlling the bus can be connected to it. As masters are usually microcontrolers, consider the case of a data transfer between two microcontrollers connected to the I²C-bus. This highlights the master-slave and receiver-transmitter relationships to be found on the I²C-bus. It should be noted that these relationships are not permanent, but depend on the direction of data transfer at that time. The transfer of data would proceed as follows:

1) Suppose microcontroler A wants to send information to microcontroller B:
   microcontroller A (master), addresses microcontroller B (slave);
   microcontroller A (master-transmitter), sends data to microcontroller B (slave-receiver);
   microcontroller A terminates the transfer.
2) If microcontroller A wants to receive information from microcontroller B:
   microcontroller A (master) addresses microcontroller B (slave);
   microcontroller A (master-receiver) receives data from microcontroller B (slave-transmitter);
   microcontroller A terminates the transfer.

Even in this situation, the master (microcontroller A) generates the timing and terminates the transfer.

The possibility of connecting more than one microcontroller to the I²C-bus means that more than one master could try to initiate a data transfer at the same time. To avoid the chaos that might ensue from such an event, an arbitration procedure has been developed. This procedure relies on the wired-AND connection of all I²C interfaces to the I²C-bus.

If two or more masters try to put information onto the bus, the first to produce a 'one' when the other produces a 'zero' will lose the arbitration. The clock signals during arbitration are a synchronized combination of the clocks generated by the masters using the wired-AND connection to the SCL line.

Generation of clock signal on the I²C-bus is the responsibility of master devices. Each master microcontroller generates its own clock signals when transferring data on the bus.

The command, diagnostic, monitoring and history functions of the microcontroller network 102 are accessed using a global network memory model in one embodiment. That is, any function may be queried simply by generating a network "read" request targeted at the function's known global network address. In the same fashion, a function may be exercised simply by "writing" to its global network address. Any microcontroller may initiate read/write activity by sending a message on the I²C bus to the microcontroller responsible for the function (which can be determined from the known global address of the function). The network memory model includes typing information as part of the memory addressing information.

Using a network global memory model in one embodiment places relatively modest requirements for the I²C message protocol.

All messages conform to the I²C message format including addressing and read/write indication.

All I²C messages use seven bit addressing.

Any controller can originate (be a Master) or respond (be a Slave).

All message transactions consist of I²C "Combined format" messages. This is made up of two back-to-back I²C simple messages with a repeated START condition between (which does not allow for re-arbitrating the bus). The first message is a Write (Master to Slave) and the second message is a Read (Slave to Master).

Two types of transactions are used: Memory-Read and Memory-Write.

Sub-Addressing formats vary depending on data type being used.

IV. REMOTE INTERFACE BOARD

Figure 3:
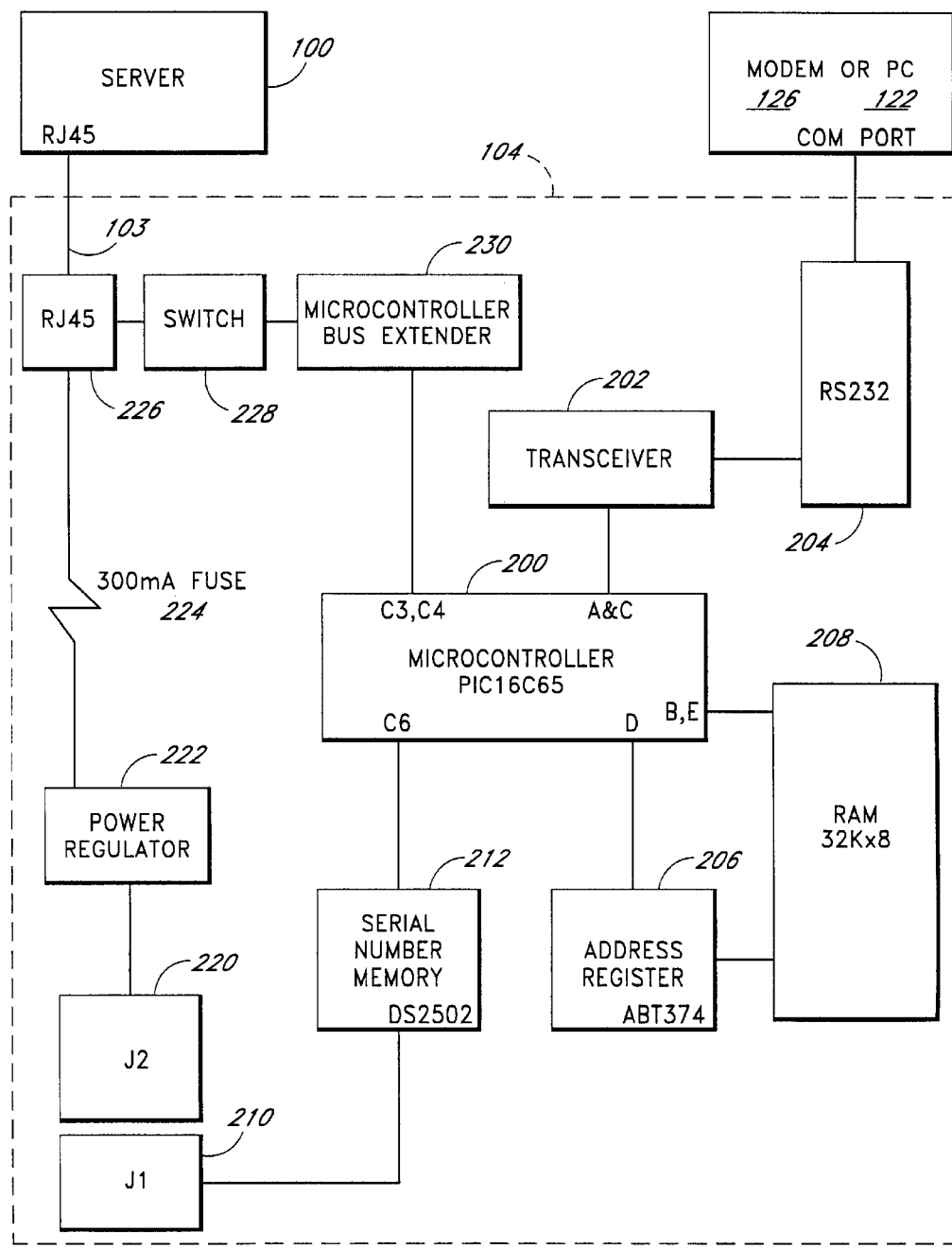
FIG. 3 is a block diagram of a remote interface board (RIB) that is part of the microcontroller network shown in FIGS. 1 and 2.

Referring to FIG. 3, the remote interface board (RIB) 104, previously shown in FIG. 1, will now be described. The RIB is an interface between the microcontroller network 102 (FIG. 1) of the server system 100 and an external client computer 122/124. The server system status and commands are passed through the RS232 connector port 204 at the client side of the RIB to the microcontroller network 102 on the server 100, controlled through the on-board PIC16C65 microcontroller 200. Signals in the microcontroller network 102 are transported by the microcontroller bus 160 (FIG. 2). In one embodiment, the microcontroller bus 160 utilizes the I²C bus protocol, previously described. The signals on the microcontroller bus 160 are received from the server 100 by the RIB 104 on the RJ-45 cable 103 and are translated by the PIC16C65 microcontroller 200 into an eight signal RS232 protocol. These RS232 signals are passed through a RS232 line transceiver 202, such as a LT1133A chip available from Linear Technology, with a baud rate capable of reaching the speed of 120 kbaud. A 25 pin D-Sub connector 204 connects to the other side of the line transceiver 202 and provides the point at which either the local client computer 122 or the server modem 126 makes a connection.

The two wire microcontroller bus 160 is brought in from the server 100 and passed to the microcontroller 200 using the RJ-45 cable 103 and RJ-45 connector 226. A switch 228, such as a QS3126 switch available from Quick Logic, connects to the RJ-45 connector 226 and provides isolation for the data and clock bus signals internal and external to the RIB 104. If the RIB 104 and switch 228 have power, the switch 228 feeds the bus signals through to a microcontroller bus extender 230. Otherwise, if the switch 228 does not have power, the microcontroller bus 160 is isolated from the RIB 104. The bus extender 230 connects between the switch 228 and the microcontroller 200. The bus extender 230 is a buffer providing drive capability for the clock and data signals. In one embodiment, the bus extender 230 is a 82B715 chip available from Philips Semiconductor. Microcontroller 200 Port C, bit 3 is the clocking bit and Port C, bit 4 is the data line.

Communication with the server modem 126 is based on the RS232 protocol. The microcontroller 200 generates the receive and the transmit signals, where the signal levels are transposed to the RS232 levels by the LT1133A line transceiver 202. There are three transmit signals, RTS, SOUT and DTR, which are from Port A, bits 2, 3 and 4 of the microcontroller 200, whereas the five receive signals are from two ports, DCD, DSR from Port C, bits 1 and 0 and SIN, CTS and RI from Port A, bits 5, 0 and 1.

In one embodiment, the 25 pin RS232 pin connector 204 is used instead a 9 pin connector, since this type of connector is more common. All the extra pins are not connected except the pins 1 and 7, where pin 1 is chassis ground and pin 7 is a signal ground.

A static random access memory (SRAM) 208 connects to the microcontroller 200. In one embodiment, the SRAM 208 is a 32 k×8 MT5LC2568 that is available from Micron Technology. The SRAM 208 is also available from other memory manufacturers. An external address register 206, such as an ABT374, available from Texas Instruments is used for latching the higher addressing bits (A8–A14) of the address for the SRAM 208 so as to expand the address to fifteen bits. The SRAM 208 is used to store system status data, system log data from the NVRAM 112 (FIG. 1), and other message data for transfer to the external interface port 204 or to a microcontroller on the microcontroller bus 160 (FIG. 2).

Port D of the microcontroller 200 is the address port. Port B is the data bus for the bi-directional data interconnect. Port E is for the SRAM enable, output tristate and write control signals. The microcontroller 200 operates at a frequency of 12 MHz.

An Erasable Programmable Read Only Memory (EPROM) 212 is used for storing board serial number identification information for the RIB 104. The serial number memory 212 is signal powered, retaining the charge into a capacitor sourced through the data line. In one embodiment, the serial number memory 212 stores eight sixteen-byte serial/revision numbers (for maintaining the rework/revision history) and is a DS2502 chip available from Dallas Semiconductor. The programming of memory 212 is handled using a jumper applied through an external connector J1 210. The serial number memory 212 connects to the microcontroller 200 at Port C, bit 6 and to the external connector J1 210.

The RIB 104 may be powered through a 7.5 Volt/800 mA supply unit that plugs into a connector J2 220. In one embodiment, the supply unit is 120 Volt AC to DC wall adapter. Connector J2 220 feeds a LT1376 high frequency switching regulator 222, available from Linear Technology, which regulates the power source. The regulated power output is used locally by the components on the RIB 104, and 300 mA are sourced to the microcontroller network 102 through a 300 mA fuse 224 and the RJ-45 connector 226. Thus, the output of the regulator 222 provides an alternative source for a bias-powered partition of the microcontroller network 102. The bias-powered partition includes the system recorder 110 (FIG. 1), the NVRAM 112 and the Chassis controller 170 (FIG. 2) which are resident on the server backplane 152.

V. REMOTE INTERFACE SERIAL PROTOCOL

The microcontroller network remote interface serial protocol communicates microcontroller network messages across a point-to-point serial link. This link is between the RIB controller 200 that is in communication with the Recovery Manager 130 at the remote client 122/124. This protocol encapsulates microcontroller network messages in a transmission packet to provide error-free communication and link security.

In one embodiment, the remote interface serial protocol uses the concept of byte stuffing. This means that certain byte values in the data stream have a particular meaning. If that byte value is transmitted by the underlying application as data, it must be transmitted as a two-byte sequence.

The bytes that have a special meaning in this protocol are:

SOM 306 Start of a message

EOM 316 End of a message

SUB The next byte in the data stream must be substituted before processing.

INT 320 Event Interrupt

Data 312 An entire microcontroller network message

As stated above, if any of these byte values occur as data in a message, a two-byte sequence must be substituted for that byte. The sequence is a byte with the value of SUB, followed by a type with the value of the original byte, which is incremented by one. For example, if a SUB byte occurs in a message, it is transmitted as a SUB followed by a byte that has a value of SUB+1.

Figure 4:
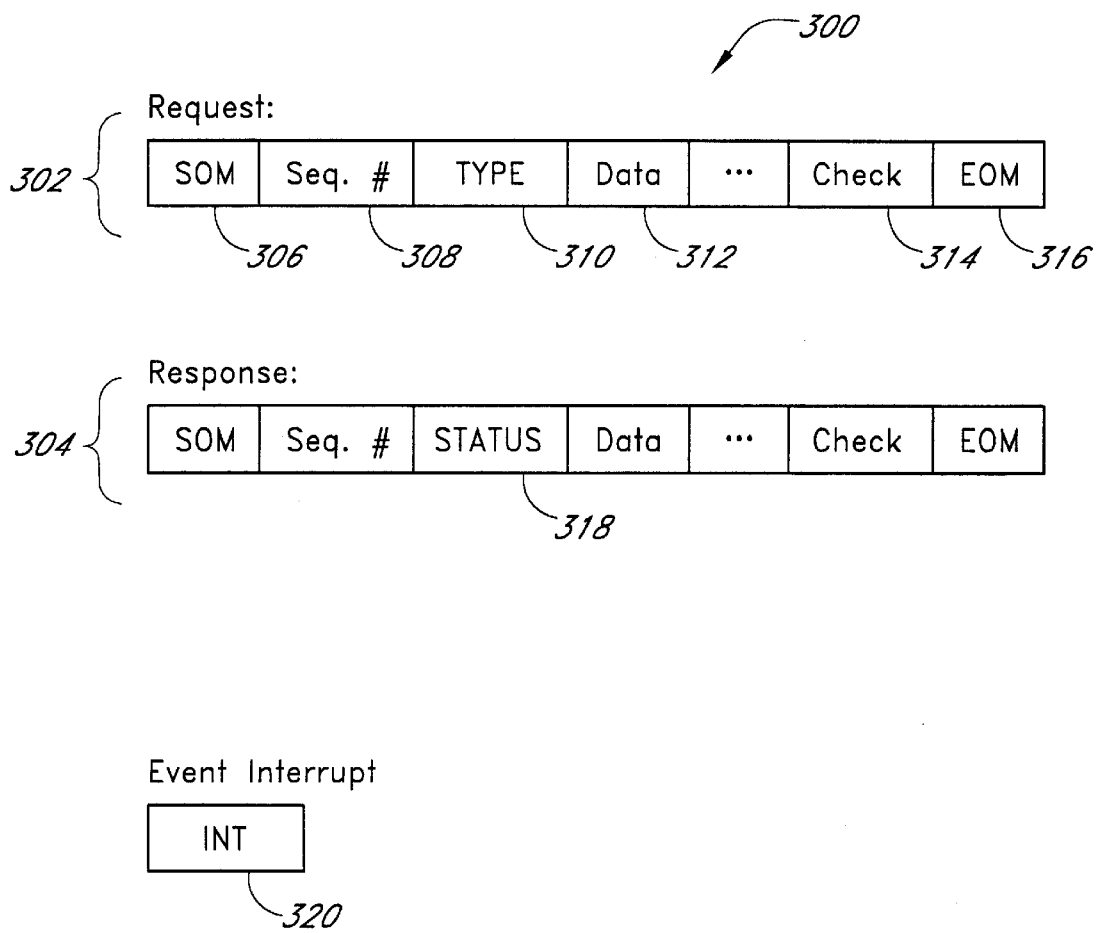
FIG. 4 is a diagram of serial protocol message formats utilized by the RIB shown in FIG. 3.

Referring to FIG. 4, the two types of messages 300 used by the remote interface serial protocol will be described.

1. Requests 302, which are sent by remote management (client) computers 122/124 (FIG. 1) to the remote interface 104.
2. Responses 304, which are returned to the requester 122/124 by the remote interface 104.

The fields of the messages are defined as follows:

SOM 306 A special data byte value marking the start of a message.

EOM 316 A special data byte value marking the end of a message.

Seq.# 308 A one-byte sequence number, which is incremented on each request. It is stored in the response.

TYPE 310 One of the following types of requests:

IDENTIFY Requests the remote interface to send back identification information about the system to which it is connected. It also resets the next expected sequence number. Security authorization does not need to be established before the request is issued.

SECURE Establishes secure authorization on the serial link by checking password security data provided in the message with the microcontroller network password.

UNSECURE Clears security authorization on the link and attempts to disconnect it. This requires security authorization to have been previously established.

MESSAGE Passes the data portions of the message to the microcontroller network for execution. The response from the microcontroller network is sent back in the data portion of the response. This requires security authorization to have been previously established.

POLL Queries the status of the remote interface. This request is generally used to determine if an event is pending in the remote interface.

STATUS 318 One of the following response status values:
  OK Everything relating to communication with the remote interface is successful.
  OK_EVENT Everything relating to communication with the remote interface is successful. In addition, there is one or more events pending in the remote interface.
  SEQUENCE The sequence number of the request is neither the current sequence number or retransmission request, nor the next expected sequence number or new request. Sequence numbers may be reset by an IDENTIFY request.
  CHECK The check byte in the request message is received incorrectly.
  FORMAT Something about the format of the message is incorrect. Most likely, the type field contains an invalid value.
  SECURE The message requires that security authorization be in effect, or, if the message has a TYPE value of SECURE, the security check failed.
Check 314 Indicates a message integrity check byte. Currently the value is 256 minus the sum of previous bytes in the message. For example, adding all bytes in the message up to and including the check byte should produce a result of zero (0).
INT 320 A special one-byte message sent by the remote interface when it detects the transition from no events pending to one or more events pending. This message can be used to trigger reading events from the remote interface. Events should be read until the return status changes form OK_EVENT to OK.

VI. RIB MICROCONTROLLER OPERATION

The remote interface is the bridge to link the microcontroller bus to the outside world via a RS232 serial port through which a client computer can be connected. A message from the remote client side via RS232 usually starts with the "Identify" command which identifies the system name. See the message format associated with FIG. 4, above. The "Identify" command should be followed by the "Security" command with a password that is checked against the password stored in the NVRAM 112 (FIG. 1). If the passwords match, the remote RS232 link is put in "secure mode" and the remote interface 104 (FIG. 1) will now pass any "message" commands on to the microcontroller network bus 160 (FIG. 2). Before the remote application program disconnects the link, it should send the "Unsecure" command to take the RS232 link out of "secure mode".

Figure 5A:
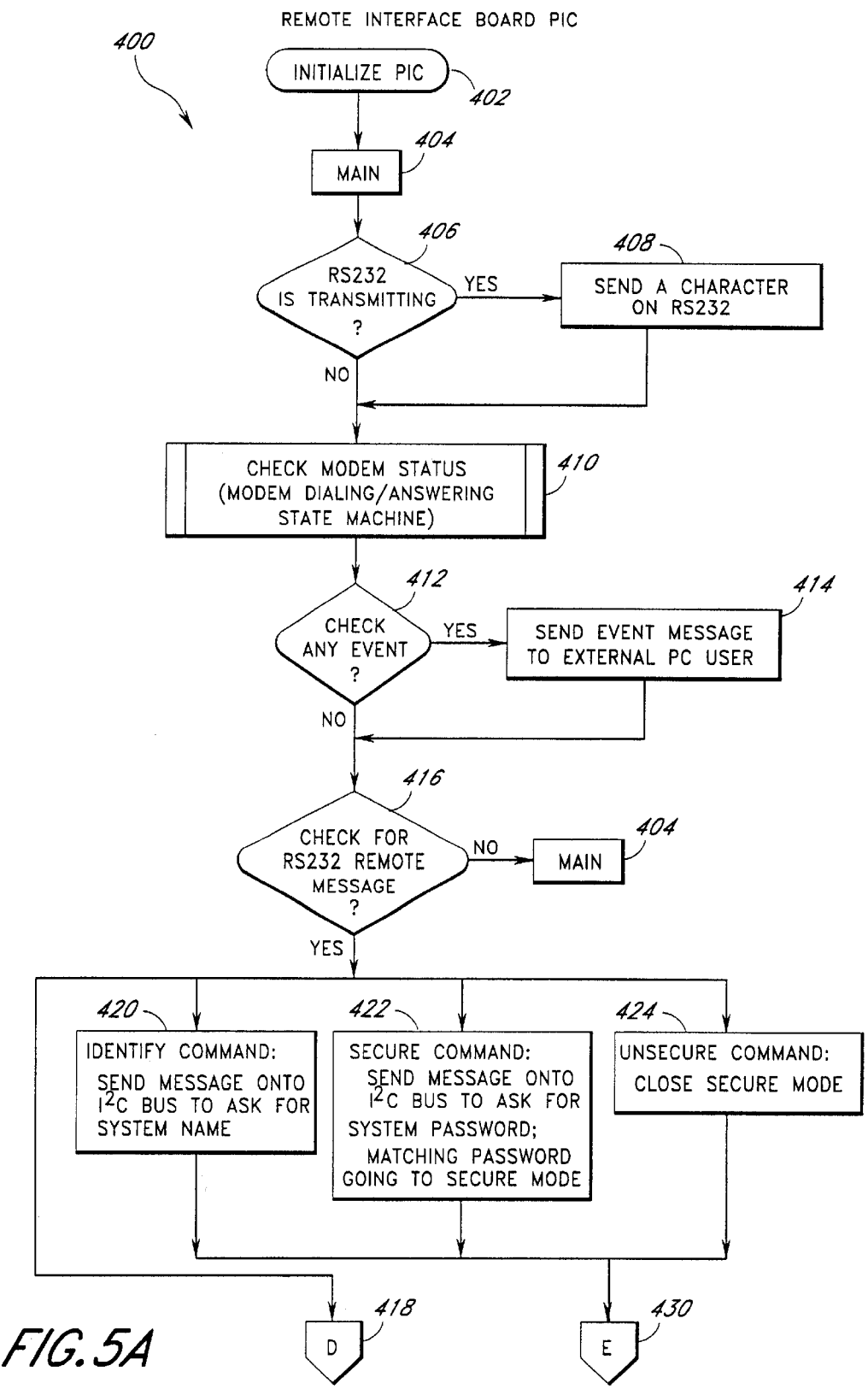
FIGS. 5a and 5b are a flowchart of a RIB microcontroller that is a part of the microcontroller network shown in FIGS. 1 and 2.
Figure 5B:
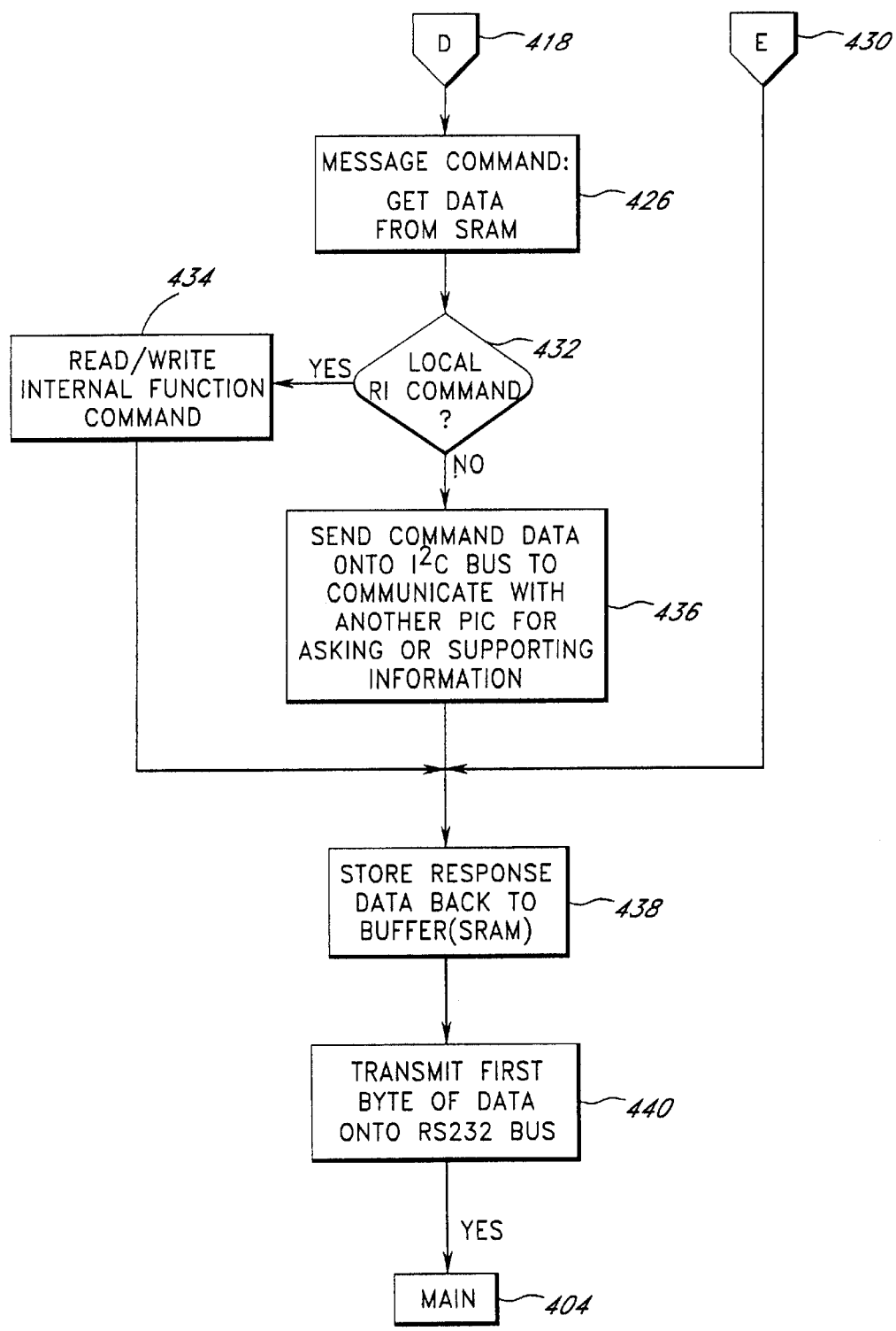

Referring to FIGS. 5a and 5b, embodiments of the RIB microcontroller process 400 will be described. The process 400 is implemented as a computer program, termed firmware, written in PIC assembly language. The assembled machine code is stored in the microcontroller EPROM where each instruction is fetched for execution by the processor. The EPROM provides 4K×14 program memory space, all on-chip. Program execution is using the internal memory. Of course, any of a variety of general purpose and special purpose processors could be used and the programming of the process 400 could be in high level code such as C or Java.

Beginning at an initialize PIC state 402, process 400 initializes the variables, stack pointer, and other structures of the RIB microcontroller 200 (FIG. 3). Moving to state 404, a return point called "main" is identified in process 400. Proceeding to a decision state 406, process 400 determines if the RS232 port is transmitting data. If so, process 400 moves to state 408 to send a character (one byte) if there is data in the SRAM 208 to be sent out on the RS232 port 204. A process of receiving data via the RS232 port 204 is not shown herein. Receiving data via the port 204 is initiated by the use of an interrupt.

At the completion of state 408, or if decision state 406 evaluates to a false condition, process 400 proceeds to a Check Modem Status function 410 that is implemented as a modem dialing and answering state machine. Function 410 checks the status of the modem 126 for any possible activity. Function 410 will be further described in conjunction with FIG. 6. Advancing to a decision state 412, process 400 determines if any server event is pending. Event types include, for example, CPU status change, power status change, canister status change, fan status change, temperature, and operating system timeout. If an event is pending, process 400 proceeds to state 414 and sends an event message to the client computer 122/124 via the RS232 port. If no event is pending, as determined at decision state 412, process 400 continues at a decision state 416. At decision state 416, process 400 checks to see if a RS232 remote message has been received from the client computer 122/124. If not, process 400 moves back to the "main" loop 404, as described above. One reason that a message has not been received yet is that the modem is not yet transmitting.

If a message has been received, as determined at decision state 416, process moves to the appropriate state 420–426 to handle one of four command types: Identify, Secure, Unsecure, and Message. At state 420, process 400 performs the Identify command and identifies the system by responding with the system name retrieved from the System Recorder memory 112 (FIG. 1).

At state 422, process 400 performs the Secure command and gets the password with the command and checks it against the password from the NVRAM 112 (FIG. 1). If the passwords match, the access right is granted (opens secure mode), otherwise, reject the intent.

At state 424, process 400 performs the Unsecure command and releases the remote access right, i.e., closes secure mode. At the completion of states 420, 422 or 424, process 400 proceeds through off-page connector E 430 to state 438 (FIG. 5b).

At state 426 on FIG. 5b (through off-page connector D 418), process 400 performs the Message command and gets remote message data from the RIB SRAM 208 (FIG. 3). Proceeding to a decision state 432, process 400 determines if this message command is for the remote interface 104. If it is, process 400 executes the internal remote interface function command, such as a Read Revision of the RIB command. If the message command is not for the remote interface, as determined by decision state 432, process 400 moves to state 436 and passes the message command to its destination (external to the remote interface) via the microcontroller bus. This facilitates communication with another microcontroller for a command to read or write information, for example.

At the completion of states 420, 422, 424, 434 or 436, process 400 advances to state 438 and stores the response data for the command into the SRAM 208 (FIG. 3) to be sent back to the client computer 122/124. Moving to state 440, process 400 transmit the first byte of data back on the RS232 port 204 to the client computer 122/124. After the byte of data has been transmitted at state 440, process 400 moves back to the "main" loop 404 (on FIG. 5a), as described above.

Referring to FIG. 6, embodiments of the Check Modem Status function 410 will now be described. Function 410 is implemented as a modem dialing and answering state machine. Several terms useful for understanding of the modem dialing and answering state machine are listed in Table 3 below.

TABLE 3

| Modem Term | Meaning |
| --- | --- |
| CTS | clear to send |
| DCD | data carrier detect |
| DSR | data set ready |
| DTR | data transfer ready |
| RTS | request to send |
| EOS | end of string |
| Protocol | indicates whether RS232 serial data uses the messaging protocol or whether the data is a string of bytes |
| Ring | modem is detecting an incoming ring signal from another modem |
| Local | a connection to a local client computer (no modem used) |
| Modem Mode | modem to modem connection |
| Modem Already Set | modem initialization string has already been sent and completed |

State machine 410 includes nine states, states 470–486. State 470 denotes that the modem is disconnected, DTR and RTS are clear and the protocol is clear. Protocol is clear indicates that no message protocol processing is to occur for bytes on the RS232 link (because it would affect transmitting and receiving of modem control string bytes). The state machine 410 remains at the Modem Disconnect state 470 while CTS is clear OR there have been "n" dialing retries already OR there is no Ring OR DSR is clear. If DSR is set (active), the state machine 410 proceeds to a Local Modem state 486, wherein RTS and DTR are set. The state machine 410 remains at state 486 while DSR is set. Is DSR clears or if Local AND Modem Mode are both set, the state machine 410 returns to Modem Disconnect state 470.

The state machine 410 proceeds to Modem Soft Reset state 472 if a Call Out condition OR a Setup condition is achieved. Call Out is achieved if Modem Mode is set AND Modem Already Set is set AND CTS is set AND there have not been "n" dialing retries already. Setup is achieved if Modem Mode is set AND Modem Already Set is clear AND CTS is set. At Modem Soft Reset state 472, DTR is set and RTS is set The state machine 410 remains at state 472 while Send String Done is clear, i.e., the modem command string is still being sent to the modem.

The state machine 410 proceeds to Modem Test state 474 when Send String Done is set. The state machine 410 remains at state 474 while Send String Done is clear. The state machine 410 proceeds to Modem Result Code state 476 when Send String Done is set. The state machine 410 remains at state 476 while Modem Result Status Done is clear, i.e., the results status of the modem test at state 474 is not yet available.

The state machine 410 returns to Modem Disconnect state 470 from state 476 if Results Status OK is clear, i.e., the results status is not OK. However, if Results Status OK is set, i.e., the results status is correct, the state machine 410 proceeds to a Modem Setup state 478, wherein Modem Already Set is set. The state machine 410 returns to Modem Disconnect state 470 from state 478 if there have been "n" dialing retries already. However, if there have not been "n" dialing retries already, the state machine 410 proceeds to a Modem Dialing state 480, wherein the modem is dialed.

The state machine 410 remains at state 480 while the previous EOS has not been reached AND two seconds have not passed. The state machine 410 returns to Modem Disconnect state 470 from state 480 if Dial OK is clear, i.e., dialing the modem was not successful. However, if Dial OK is set, i.e., dialing the modem was successful, the state machine 410 proceeds to a Modem Answering state 482. Another path to the Modem Answering state 482 is from the Modem Disconnect state 470 when a Ringing mode is achieved. Ringing mode is achieved if Modem Mode is set AND Modem Already Set is set AND CTS is set AND Ring is set. The state machine 410 remains at state 482 while DSR is clear OR DCD is clear. The state machine 410 returns to Modem Disconnect State 470 from state 482 if DCD is clear and a timeout occurs, i.e., no DCD is set within a timeout period (nobody answers). The state machine 410 proceeds to Remote Modem state 484 when DSR is set AND DCD is set. The modem transfers message data while at this state. When DCD clears, the state machine 410 returns to Modem Disconnect state 470 from state 484 or otherwise remains at state 484.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

Appendix A

Incorporation by Reference of Commonly Owned Applications

The following patent applications, commonly owned and filed Oct. 1, 1997, are hereby incorporated herein in their entirety by reference thereto:

| Title | Application Ser. No. |
| --- | --- |
| "Method of Remote Access and Control of Environmental Management" | 08/942,215 |
| "System for Independent Powering of Diagnostic Processes on a Computer System" | 08/942,410 |
| "Method of Independent Powering of Diagnostic Processes on a Computer System" | 08/942,320 |
| "Diagnostic and Managing Distributed Processor System" | 08/942,402 |
| "Method for Managing a Distributed Processor System" | 08/942,448 |
| "System for Mapping Environmental Resources to Memory for Program Access" | 08/942,222 |
| "Method for Mapping Environmental Resources to Memory for Program Access" | 08/942,214 |
| "Hot Add of Devices Software Architecture" | 08/942,309 |
| "Method for The Hot Add of Devices" | 08/942,306 |
| "Hot Swap of Devices Software Architecture" | 08/942,311 |
| "Method for The Hot Swap of Devices" | 08/942,457 |
| "Method for the Hot Add of a Network Adapter on a System Including a Dynamically Loaded Adapter Driver" | 08/943,072 |
| "Method for the Hot Add of a Mass Storage Adapter on a System Including a Statically Loaded Adapter Driver" | 08/942,069 |
| "Method for the Hot Add of a Network Adapter on a System Including a Statically Loaded Adapter Driver" | 08/942,465 |
| "Method for the Hot Add of a Mass Storage Adapter on a System Including a Dynamically Loaded Adapter Driver" | 08/962,963 |
| "Method for the Hot Swap of a Network Adapter on a System Including a Dynamically Loaded Adapter Driver" | 08/943,078 |
| "Method for the Hot Swap of a Mass | 08/942,336 |

| Title | Application Ser. No. |
|---|---|
| Storage Adapter on a System Including a Statically Loaded Adapter Driver" | |
| "Method for the Hot Swap of a Network Adapter on a System Including a Statically Loaded Adapter Driver" | 08/942,459 |
| "Method for the Hot Swap of a Mass Storage Adapter on a System Including a Dynamically Loaded Adapter Driver" | 08/942,458 |
| "Method of Performing an Extensive Diagnostic Test in Conjunction with a BIOS Test Routine" | 08/942,463 |
| "Apparatus for Performing an Extensive Diagnostic Test in Conjunction with a BIOS Test Routine" | 08/942,163 |
| "Configuration Management Method for Hot Adding and Hot Replacing Devices" | 08/941,268 |
| "Configuration Management System for Hot Adding and Hot Replacing Devices" | 08/942,408 |
| "Apparatus for Interfacing Buses" | 08/942,382 |
| "Method for Interfacing Buses" | 08/942,413 |
| "Computer Fan Speed Control Device" | 08/942,447 |
| "Computer Fan Speed Control Method" | 08/942,216 |
| "System for Powering Up and Powering Down a Server" | 08/943,076 |
| "Method of Powering Up and Powering Down a Server" | 08/943,077 |
| "System for Resetting a Server" | 08/942,333 |
| "Method of Resetting a Server" | 08/942,405 |
| "System for Displaying Flight Recorder" | 08/942,070 |
| "Method of Displaying Flight Recorder" | 08/942,068 |
| "Synchronous Communication Interface" | 08/943,355 |
| "Synchronous Communication Emulation" | 08/942,004 |
| "Software System Facilitating the Replacement or Insertion of Devices in a Computer System" | 08/942,317 |
| "Method for Facilitating the Replacement or Insertion of Devices in a Computer System" | 08/942,316 |
| "System Management Graphical User Interface" | 08/943,357 |
| "Display of System Information" | 08/942,195 |
| "Data Management System Supporting Hot Plug Operations on a Computer" | 08/942,129 |
| "Data Management Method Supporting Hot Plug Operations on a Computer" | 08/942,124 |
| "Alert Configurator and Manager" | 08/942,005 |
| "Managing Computer System Alerts" | 08/943,356 |
| "Computer Fan Speed Control System" | 08/940,301 |
| "Computer Fan Speed Control System Method" | 08/941,267 |
| "Black Box Recorder for Information System Events" | 08/942,381 |
| "Method of Recording Information System Events" | 08/942,164 |
| "Method for Automatically Reporting a System Failure in a Server" | 08/942,168 |
| "System for Automatically Reporting a System Failure in a Server" | 08/942,384 |
| "Expansion of PCI Bus Loading Capacity" | 08/942,404 |
| "Method for Expanding PCI Bus Loading Capacity" | 08/942,223 |
| "System for Displaying System Status" | 08/942,347 |
| "Method of Displaying System Status" | 08/942,071 |
| "Fault Tolerant Computer System" | 08/942,194 |
| "Method for Hot Swapping of Network Components" | 08/943,044 |
| "A Method for Communicating a Software Generated Pulse Waveform Between Two Servers in a Network" | 08/942,221 |
| "A System for Communicating a Software Generated Pulse Waveform Between Two Servers in a Network" | 08/942,409 |
| "Method for Clustering Software Applications" | 08/942,318 |
| "System for Clustering Software Applications" | 08/942,411 |
| "Method for Automatically Configuring a Server after Hot Add of a Device" | 08/942,319 |
| "System for Automatically Configuring a Server after Hot Add of a Device" | 08/942,331 |
| "Method of Automatically Configuring and Formatting a Computer System and Installing Software" | 08/942,412 |
| "System for Automatically Configuring and Formatting a Computer System and Installing Software" | 08/941,955 |
| "Determining Slot Numbers in a Computer" | 08/942,462 |
| "System for Detecting Errors in a Network" | 08/942,169 |
| "Method of Detecting Errors in a Network" | 08/940,302 |
| "System for Detecting Network Errors" | 08/942,407 |
| "Method of Detecting Network Errors" | 08/942,573 |

APPENDIX B

Provisional Patent Application 6391–710:

Title: REMOTE ACCESS AND CONTROL OF ENVIRONMENTAL MANAGEMENT SYSTEM

Invs: Karl Johnson

Tahir Sheik

The following documents are attached and form part of this disclosure:

1. *Maestro Recovery Manager Analysis-Problem Statement*, pp.1–10.

2. *Remote Interface Board Specification*, Revision 2 13-000072-01, Jun. 21, 1996, pp. 1–11.

Multiple Node Service Processor Network

A means is provided by which individual components of a system are monitored and controlled through a set of independent, programmable microcontrollers interconnected through a network. Further means are provided to allow access to the microcontrollers and the interconnecting network by software running on the host processor.

Fly-by-wire

A means is provided by which all indicators, push buttons and other physical control means are actuated via the multiple node service processor network. No indicators, push buttons or other physical control means are physically connected to the device which they control, but are connected to a microcontroller, which then actuates the control or provides the information being monitored.

Self-Managing Intelligence

A means is provided by which devices are managed by the microcontrollers in a multiple node service processor network by software running on one or more microcontrollers, communicating via the interconnecting network Management of these devices is done entirely by the service processor network, without action or intervention by system software or an external agent.

Flight Recorder

A means is provided for recording system events in a non-volatile memory, which may be examined by external agents. Such memory may be examined by agents external to the network interconnecting the microcontrollers.

Replicated components: no single point of failure

A means is provided by which no single component failure renders the monitoring and control capability of the system inoperable.

Extension by serial or modem gateway

A means is provided allowing an external agent to communicate with the microcontrollers by extending the interconnecting network beyond the physical system.

The following provisional patent applications, commonly owned and filed on the same day as the present application, are related to the present application and are incorporated by reference:

COMPUTER SYSTEM HARDWARE INFRASTRUCTURE FOR HOT PLUGGING MULTI-FUNCTION PCI CARDS WITH EMBEDDED BRIDGES (6391–704); invented by:

Don Agneta

Stephen E. J. Papa

Michael Henderson

Dennis H. Smith

Carlton G. Amdahl

Walter A. Wallach

COMPUTER SYSTEM HARDWARE INFRASTRUCTURE FOR HOT PLUGGING SINGLE AND MUTI-FUNCTION PC CARDS WITHOUT EMBEDDED BRIDGES (6391–705); invented by:

Don Agneta

Stephen E. J. Papa

Michael Henderson

Dennis H. Smith

Carlton G. Amdahl

Walter A. Wallach

ISOLATED INTERRUPT STRUCTURE FOR INPUT/OUTPUT ARCHITECTURE (6391–706); invented by:

Dennis H. Smith

Stephen E. J. Papa

THREE BUS SERVER ARCHITECTURE WITH A LEGACY PCI BUS AND MIRRORED I/O PCI BUSES (6391–707); invented by:

Dennis H. Smith

Carlton G. Amdahl

Don Agneta

HOT PLUG SOFTWARE ARCHITECTURE FOR OFF THE SHELF OPERATING SYSTEMS (6391–708); invented by:

Walter A. Wallach

Mehrdad Khalili

Mallikarunan Mahalingam

John Reed

REMOTE SOFTWARE FOR MONITORING AND MANAGING ENVIRONMENTAL MANAGEMENT SYSTEM (6391–709); invented by:

Ahmad Nouri

REMOTE ACCESS AND CONTROL OF ENVIRONMENTAL MANAGEMENT SYSTEM (6391–710); invented by:

Karl Johnson

Tahir Sheik

HIGH PERFORMANCE NETWORK SERVER SYSTEM MANAGEMENT INTERFACE (6391–711); invented by:

Srikumar Chari

Kenneth Bright

Bruno Sartirana

CLUSTERING OF COMPUTER SYSTEMS USING UNIFORM OBJECT NAMING AND DISTRIBUTED SOFTWARE FOR LOCATING OBJECTS (6391–712); invented by:

Walter A. Wallach

Bruce Findley

MEANS FOR ALLOWING TWO OR MORE NETWORK INTERFACE CONTROLLER CARDS TO APPEAR AS ONE CARD TO AN OPERATING SYSTEM (6391–713); invented by:

Walter A. Wallach

Mallikarunan Mahalingam

HARWARE AND SOFTWARE ARCHITECTURE FOR INTER-CONNECTTNG AN ENVIRONMENTAL MANAGEMENT SYSTEM WITH A REMOTE INTERFACE (6391–714); invented by:

Karl Johnson

Walter A. Wallach

Dennis H. Smith

Carl G. Amdahl

SELF MANAGEMENT PROTOCOL FOR A FLY-BY-WIRE SERVICE PROCESSOR (6391–715); invented by:

Karl Johnson

Walter A. Wallach

Dennis H. Smith

Carl G. Amdahl

Problem Statement

Introduction

Maestro Recovery Manager(MRM) is a software which locally or remotely manage a Raptor when a server is down or up, operating system died, LAN communication failed, or other server components failed.

User will be able to manage the server in very simple, usable, and friendly GUI environment. MRM use modem for remote and serial communication port for local to communicate with server for diagnostic and recovery.

Primary role of remote management is diagnosing and restoring service as quickly as possible in case of a service failure.

System administrator, LAN administrator in customer shop and NetFrame Technical support will be primary user for the system.

Requirement Sources

MRM requirement comes from the following

1—Focus Group (Customer Support and Training)

2—User Walkthrough held by MRM team and Customer Support in December 1996

3—Down System Management Road map (96)

This road map is preliminary road map combined with Up System Management road map.

4—MRM Road Map 97–98

This Road Map presented to Engineering Council Meeting on Mar. 10, 1997.

5—Raptor System, A Bird's Eye View.

6—Raptor Wire Service Architecture

The following requirements have been identified for MRM

Support Remote Management for Diagnostic and Recovery

Remote Management cover remote access to the Raptor Out Of Band management features. Remote Management will use Out of Band ,Control Diagnostic and Monitor Subsystem (CDM) remote management to cover the other high value added remote management functions. primary role of remote management is diagnosing and restoring service as quickly as possible in case of service failure.

Support Remote Management . . . (continue)

The control of Raptor is completely "Fly By Wire"—i.e. no physical switch directly controls any function and no indicator is directly controlled by system hardware. All such functions referred to as "Out of Band" functions are controlled through a CDM. CDM basic functions are available so long as A/C power is available at the input to any of the power supplies.

CDM Subsystem supervises or monitors the following system features.

Power supplies—Presence, status, A/C good, Power on/off and output voltage.

Environment—Ambient and exhaust temperatures, Fan speed, speed control, Fan fault and overtemp indicators.

Processor—CPU Presence, Power OK, Overtemp and Fault, NMI control, System reset Memory type/ location and Bus/Core speed ratio.

I/O—I/O canister insertion/removal and status indicator, PCI card presence, PCI card power and smart I/O processor Out Of Band control.

Historical—Log of all events, Character mode screen image, and Serial number

Support for Object Oriented Graphic User Interface

OO-GUI is graphic user interface with the following characteristic.

User task oriented

It uses tasks which user familiar and daily working with. User does not need to learn the task User objects It uses objects which user working with during her or his daily work.

Simplicity and useablity

It is very simple to use and does not need long learning period.

Point and click with context sensitive help

Context sensitive help and point and click will help user to be very productive and get any information he needs on specific object or field or subject.

Drag and drop

Drag and Drop capability works with user object very well to accomplish the tasks.

Release Requirements (MRM V2.0, 4Q96)

Maestro Recovery Manager (MRM )will support the following features locally through serial port and Wire Service Remote Interface card on the Raptor 16.

MRM provide user friendly GUI with post and click capability to perform the following tasks which reviewed and accepted by the Focus Group for 4Q96 release.

Power On/Off

MRM support Power On/Off the server.

User can do this task by right mouse click on the server object in the screen and see the result.

Display Flight Recorder.

While the server is working, Wire Service record all the server information in the 64K NVRAM. After the server failed, MRM will display the system log recorded in the NVRAM. User can evaluate the information and find the cause for the server failure. This can be done by right mouse click on the Flight Recorder object in the screen.

System Reset

MRM support rebooting the server by right mouse click on the server object in the screen. This is warm reboot of the server and works as pushing the "reset" button on the server.

Save

MRM will support saving Flight Recorder data, so user can send the file to the technical support for further diagnostic and recovery. It also can save the response for any Wire Service command failure.

On Line help

MRM will support online help contains overview, Getting Started, MRM tasks, Diagnostic and Recovery, and BIOS help.

B0back plane support

MRM will support the server with B0back plane. Server with B0back plane display wrong time stamp. MRM uses NetWare 4.11 Operating system time stamp to display correct time stamp.

Release Requirements (MRM V2.1, 1Q97)

Maestro Recovery Manager (MRM) will support Raptor16 Phase 2 for next release as follow. This release will delivered to customer by NetFrame Customer Support on CD.

MRM V2.1

MRM V 2.1 will support the MRM V2.0 plus the following new features for next release.

User Walkthrough Requirements held on Dec. 17, 1996

Recovery and Diagnostic help.

This help enable the user to display help based on message source or severity (fatal error, error, waning,). In each case the help inform the user the cause for the error and what steps to take to solve the problem.

C0/E18 back plane support

New C0 back plane Wire Service, Diagnostic, and BIOS message structure

Release Requirements (MRM V2.2, 2Q97)

MRM V2.2 for Raptor 16

MRM V2.2 will support MRM V2.1 plus the following new features.

Remote connection via modem

MRM supports remote connection to an NF9000-16 via an external modem. MRM needs one external modem for client side and one external modem for the server side. The client modem can be installed and set up via the Windows NT/95 standard control panel/Modems installation. The server side modem has to be set up and connected to the server. Details of installation and setup for the modem are provided in the NF9000 Maestro Recovery Manager Installation Guide.

MRM does not support internal modems.

The following external Hayes compatible modems have been tested and worked with MRM.

Client Modem

US Robotics Sportster 33.6 Fax modem

ZOOM fax MODEM V.34X 33.6

Server Modem

ZOOM fax MODEM V.34X 33.6

System Status

MRM supports retrieve and update of the system status components.

System status comprised of the following components.

Power Supplies

The following information will be displayed for this feature.

1. Presence

2. Status(ACOK,DCOK)

3. Power On/off

4. Output voltage (Analog measure of main supply+ VREF)

Temperatures

We will support four types of temperature for 5 sensors and display Operating (10–35 degree C.) and None-operating (−40 to 70 degree C.).
1. Temperature of all sensors
2. Warning temperature
3. Shutdown temperature
4. System over temp Fans There are different type of fans in the system such as system fan and canister fan. All of them have the common following characteristics.
5. Speed (speed data)
6. Control (LOLIM, can be set to LOW or HIGH)
7. Fault ( LED, Bits)

Processors

There are 4 CPU in the Raptor16 with the following parameters.
1. CPU presence
2. CPU Power OK
3. System over temp
4. System Fault
If system over temp or CPU internal error or system power failure. then wire service report System Fault
5. CPU Error
If internal CPU error occurred, then report CPU error
6. CPU NMI control
7. System Board Bus/Core speed ratio I/O Canisters There are four canisters available
1. I/O canister (insertion, removal)
This shows presence bits for canister.
2. PCI cards
This reflect PCI card slots [1–4] presence
3. PCI card power
This controls canister PCI slot power Serial Numbers This is the last known serial data for the following server parts
1. Back plane
2. Canister 1–4
3. Remote Interface (not implemented)
4. System Board
5. Power supply 1–2

Revisions

MRM will support the following chips revision
1. Back Plane
2. System board
3. Power Supply 1–2
4. Canisters 1–4
5. Local Interface
6. Remote Interface Context-sensitive Help All elements in the window such as icon, entry field, push button, and radio button have context-sensitive help. This help contains the following type.

What's this

It shows description of each elements in the window which it is not disabled. This can be accomplished by right mouse click on each element in the window.

Help push button.

This display general help for all windows.

F1 Key

The key displays the help for any entry field in the window.

Print MRM supports printing of flight recorder based on all messages, warning & errors, and errors with one type of font.

Password

Wire Service password is originally set by Manufacturing to "NETFRAME" (case sensitive) for every NF9000-16 server. MRM provides a password changing mechanism for the Wire Service system. For security purposes, MRM only allows the password to be changed via the local serial port connection and not via the remote connection Support B0/E18 on NT4.0 server MRM supports B0/E18 configurations by utilizing a time stamp software component which resides on the NT4.0 server.

Installation instructions for the time stamp are provided in the NTReadMe file on floppy disk packaged with MRM.

MRM requires the NetFRAME NT Value Add software to operate.

The NetFRAME NT Value Add software will automatically install the time stamp for you. If you have not installed NetFRAME NT Value Add, then you need to install the time stamp provided for you on the NTSup floppy disk.

Support for InstallShield

InstallShield setup software is used to install MRM on the client workstation.

Delivery

MRM package contains the following.

NF9000 Maestro Recovery Manager CD release.

This CD contains MRM software and documentation.

Two support floppy disks for NF9000-16 B0 back plane for NT and NetWare.

Boxes contain above items, Remote Interface Card, adapter, cables, and documentation.

Dependency

MRM version 2.2 depends on the following items:

Remote Interface chip provided by Wire Service(Firm Ware) department.

Remote Interface card provided by Hardware Engineering department.

Remote Interface boxes, cables, and power adapters provided by Manufacturing.

Release Requirements (MRM V2.2, 2Q97)

MRM V2.2 for Raptor 8

MRM V2.2 for Raptor 8 has the same features as MRM v2.2 for Raptor16 with the following different.

Support for C0 back plane and F18 BIOS

System Status

The following components of System Status are different from MRM V2.2 for Raptor16.

Power Supplies
1. User can not turn off and on specific power supply.
2. Raptor 8 has three power supply.
3. There are no DC (OK, BAD) for Raptor 8.
4. AC for all power supplies are good all the times.

Fans
1. Four system board fans in front
2. Two system board fans (Storage fans) in back
3. Group A and group B sharing two fans.

I/O Groups
1. Group A contains 4 PCI card sots
2. Group B contains 4 PCI card slots.

Serial Numbers
1. Serial number for Group A and B fans are the same.

2. There is serial number for power supply # 3.
Revisions
   1. Group A and B fans have the same revision.
   2. There is revision for power supply #3
Delivery
MRM package contains the following.
NF9000 Maestro Recovery Manager CD release.
This CD contains MRM software and documentation.
Boxes contain above items, Remote Interface Card, adapter, cables, and documentation.

What is claimed is:

1. A remote interface, comprising:

a microcontroller;

a microcontroller bus providing data communication among the microcontroller and other microcontrollers;

a memory in data communication with the microcontroller;

a first port, in data communication with the microcontroller, being capable of receiving and transmitting monitoring data external to the remote interface; and a second port capable of receiving and transmitting environmental conditions data, wherein the environmental conditions data corresponds to the environmental conditions of a computer, and wherein the second port includes connectivity to the microcontroller bus.

2. The remote interface of claim 1, wherein the microcontroller bus conforms to the Inter-Integrated Circuit ($I^2C$) protocol.

3. The remote interface of claim 1, wherein the microcontroller bus conforms to the Controller Area Network (CAN) protocol.

4. The remote interface of claim 1, wherein the monitoring data is stored in the memory.

5. The remote interface of claim 1, wherein the first port receives a command from a client computer.

6. The remote interface of claim 5, wherein the command establishes security authorization.

7. The remote interface of claim 5, wherein the command requests data from the memory.

8. The remote interface of claim 5, wherein the command sends data to the microcontroller bus.

\* \* \* \* \*

US006266721C1

(12) EX PARTE REEXAMINATION CERTIFICATE (10590th)
United States Patent
Sheikh et al.

(10) Number: US 6,266,721 C1
(45) Certificate Issued: May 11, 2015

(54) SYSTEM ARCHITECTURE FOR REMOTE ACCESS AND CONTROL OF ENVIRONMENTAL MANAGEMENT

(75) Inventors: Tahir Q. Sheikh, Fremont, CA (US); Karl S. Johnson, Palo Alto, CA (US); Ken Nguyen, San Jose, CA (US)

(73) Assignee: ROUND ROCK RESEARCH, LLC, Mt. Kisco, NY (US)

Reexamination Request:
No. 90/012,327, May 30, 2012

Reexamination Certificate for:
Patent No.: 6,266,721
Issued: Jul. 24, 2001
Appl. No.: 08/942,160
Filed: Oct. 1, 1997

Related U.S. Application Data

(60) Provisional application No. 60/046,397, filed on May 13, 1997, provisional application No. 60/046,416, filed on May 13, 1997, provisional application No. 60/047,016, filed on May 13, 1997.

(51) Int. Cl.
*G06F 11/07* (2006.01)
*G06F 1/20* (2006.01)
(Continued)

(52) U.S. Cl.
CPC .. *G06F 1/20* (2013.01); *G06F 1/26* (2013.01); *G06F 11/0766* (2013.01); *G06F 9/4411* (2013.01); *G06F 11/3058* (2013.01);
(Continued)

(58) Field of Classification Search
None
See application file for complete search history.

(56) References Cited

To view the complete listing of prior art documents cited during the proceeding for Reexamination Control Number 90/012,327, please refer to the USPTO's public Patent Application Information Retrieval (PAIR) system under the Display References tab.

*Primary Examiner* — Charles Craver

(57) ABSTRACT

A fault tolerant system by which individual components of a server are monitored and controlled through independent, programmable microcontrollers interconnected through a microcontroller network. An external agent can control and monitor the microcontrollers by extending the interconnection network beyond the physical server. The extension to the interconnection network converts protocols between media, and directs the microcontrollers and the state managed by the microcontrollers. Intervention of the server operating system software is not required and is not utilized for the access and control operations. A remote interface board provides the interface between the microcontroller network and an external modem that communicates with a remote client computer. The remote interface board also provides for connection to a local client computer.

Attention is directed to the decision of *Round Rock Research, Llc v. Oracle Corporation Et Al* US Dist TX (Eastern) 4:11cv332 relating to this patent. This reexamination may not have resolved all questions raised by this decision. See 37 CFR 1.552(c) for *ex parte* reexamination and 37 CFR 1.906(c) for *inter partes* reexamination.

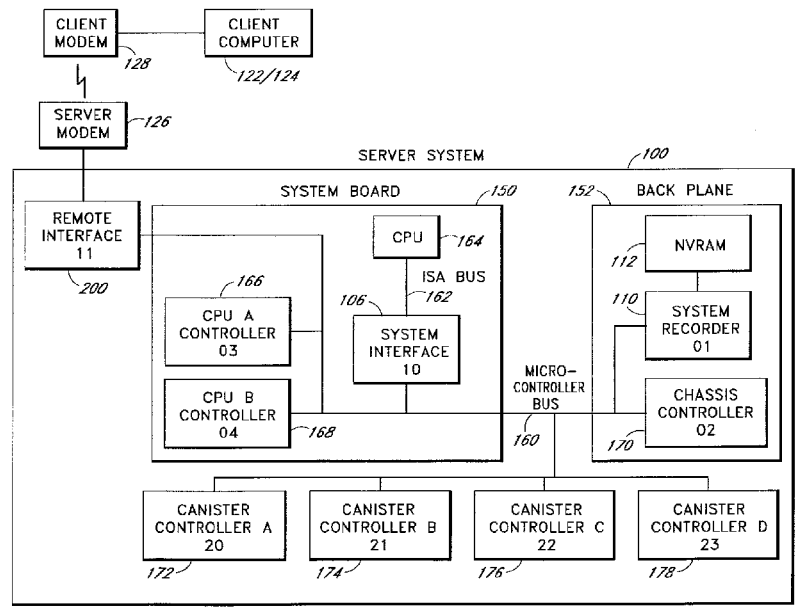

(51) Int. Cl.
*G06F 1/26* (2006.01)
*G06F 13/40* (2006.01)
*G06F 13/38* (2006.01)
*G06F 11/32* (2006.01)
*G06F 9/445* (2006.01)
*G06F 11/30* (2006.01)
*G06F 11/00* (2006.01)
*G06F 11/273* (2006.01)
*G06F 11/34* (2006.01)
*G06F 1/00* (2006.01)
*G06F 21/00* (2013.01)
*H04L 12/26* (2006.01)
*H04L 12/24* (2006.01)
*H04L 12/40* (2006.01)
*H04L 12/56* (2006.01)
*H04L 12/12* (2006.01)
*H05K 7/20* (2006.01)
*H02P 7/285* (2006.01)
*H02P 7/18* (2006.01)
*G06F 9/44* (2006.01)
*G06F 11/22* (2006.01)
*G06F 21/30* (2013.01)
*G06F 21/31* (2013.01)
*G06F 3/06* (2006.01)

(52) U.S. Cl.
CPC ........ *G06F 11/2294* (2013.01); *G06F 11/3065* (2013.01); *G06F 11/3051* (2013.01); *G06F 11/3055* (2013.01); *G06F 11/3006* (2013.01); *G06F 11/0787* (2013.01); *G06F 11/0748* (2013.01); *G06F 9/44521* (2013.01); *H05K 7/20209* (2013.01); *G06F 13/4027* (2013.01); *G06F 11/328* (2013.01); *G06F 21/305* (2013.01); *G06F 11/3466* (2013.01); *H04L 12/2602* (2013.01); *H04L 43/0817* (2013.01); *H02P 7/285* (2013.01); *H04L 41/22* (2013.01); *G06F 21/31* (2013.01); *H04L 12/40032* (2013.01); *G06F 13/385* (2013.01); *H04L 41/042* (2013.01); *H05K 7/20727* (2013.01); *H04L 12/12* (2013.01); *G06F 1/206* (2013.01); *G06F 11/3476* (2013.01); *G06F 3/0601* (2013.01); *H04L 41/0213* (2013.01); *G06F 2003/0692* (2013.01); *H04L 2012/40215* (2013.01); *H04L 41/0681* (2013.01); *H04L 41/0886* (2013.01); *Y02B 60/34* (2013.01); *G06F 11/0793* (2013.01); *G06F 2201/86* (2013.01); *G06F 11/3495* (2013.01)

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-8 are cancelled.

New claims 9-18 are added and determined to be patentable.

9. *The remote interface of claim 1, wherein the microcontroller comprises an independently functional system recorder microcontroller.*

10. *The remote interface of claim 9, wherein the independently functional system recorder microcontroller is configured to assign an absolute time value to one or more events associated with the environmental conditions.*

11. *The remote interface of claim 10, further comprising a four-byte counter which is incremented every second is configured to generate the absolute time value.*

12. *The remote interface of claim 1, wherein the microcontroller and the other microcontrollers are configured to report a system failure to a remote computer via the first port; and*
    *wherein, to execute the report, the microcontroller network is configured to:*
        *set a bit in a bit vector within the remote interface, wherein the setting of the bit corresponds to a specified type of system failure.*

13. *A remote interface, comprising:*
    *a microcontroller;*
    *a microcontroller bus providing data communication among the microcontroller and other microcontrollers thereby forming a microcontroller network;*
    *a memory in data communication with the microcontroller;*
    *a first port, in data communication with the microcontroller, being capable of receiving and transmitting monitoring data external to the remote interface; and*
    *a second port capable of receiving and transmitting environmental conditions data,*
    *wherein the environmental conditions data corresponds to the environmental conditions of a computer, and wherein the second port includes connectivity to the microcontroller bus;*
    *wherein the first port is in operative communication with a plurality of sensors disposed within the microcontroller network.*

14. *The remote interface of claim 13, wherein the microcontroller network is configured to allow an application to access one or more functions associated with individual ones of the plurality of sensors via the first port, the application being configured to execute on a remote computer; and*
    *wherein the application is configured to access a listing, the listing comprising global memory addresses, the global memory addresses configured to allow access to the one or more functions, the global memory addresses configured to obviate acquisition of knowledge of a structure of the microcontroller network by the application.*

15. *The remote interface of claim 14, wherein the one or more functions comprise a request for a fan speed.*

16. *The remote interface of claim 14, wherein the one or more functions comprise a request for a temperature.*

17. *The remote interface of claim 14, wherein the one or more functions comprise a request to change a fan speed.*

18. *A remote interface, comprising:*
    *a microcontroller;*
    *a microcontroller bus providing data communication among the microcontroller and other microcontrollers;*
    *a memory in data communication with the microcontroller;*
    *a first port, in data communication with the microcontroller, being capable of receiving and transmitting monitoring data external to the remote interface;*
    *a second port capable of receiving and transmitting environmental conditions data,*
    *wherein the environmental conditions data corresponds to the environmental conditions of a computer, and wherein the second port includes connectivity to the microcontroller bus;*
    *wherein the environmental conditions data comprises an indication of a device failure; and*
    *wherein at least one microcontroller thereof is configured to perform a check for a device removal in response to the indication of a device failure.*

* * * * *